United States Patent
Passman et al.

(10) Patent No.: US 9,722,464 B2
(45) Date of Patent: Aug. 1, 2017

(54) GAS TURBINE ENGINE ACTUATION SYSTEMS INCLUDING HIGH TEMPERATURE ACTUATORS AND METHODS FOR THE MANUFACTURE THEREOF

(71) Applicant: HONEYWELL INTERNATIONAL INC., Morristown, NJ (US)

(72) Inventors: Eric Passman, Piscataway, NJ (US); James Piascik, Randolf, NJ (US); Robert Franconi, New Hartford, CT (US); Jimmy Wiggins, Chandler, AZ (US); Leroy Allen Fizer, Huntington Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1233 days.

(21) Appl. No.: 13/801,476

(22) Filed: Mar. 13, 2013

(65) Prior Publication Data
US 2014/0339938 A1  Nov. 20, 2014

(51) Int. Cl.
*H02K 1/12* (2006.01)
*H02K 1/14* (2006.01)
(Continued)

(52) U.S. Cl.
CPC ............ *H02K 1/12* (2013.01); *F01D 17/162* (2013.01); *F02C 7/042* (2013.01); *F02C 7/32* (2013.01);
(Continued)

(58) Field of Classification Search
CPC .. H02K 3/47; H02K 1/12; H02K 1/14; H02K 1/146; H02K 1/148; H02K 3/325;
(Continued)

(56) References Cited

U.S. PATENT DOCUMENTS

| | | |
|---|---|---|
| 1,722,362 A | 7/1929 | Wiley |
| 1,742,018 A | 12/1929 | Wermine |

(Continued)

FOREIGN PATENT DOCUMENTS

| | | |
|---|---|---|
| CN | 2529429 | 1/2003 |
| CN | 1174814 C | 11/2004 |

(Continued)

OTHER PUBLICATIONS

Brazier, R.F., et al. "Cables for aircraft. Pressure-type connections," Proceedings of the Institution of Electrical Engineers, Jan. 1, 1967, p. 1307, vol. 114, No. 9.

(Continued)

*Primary Examiner* — Burton Mullins
(74) *Attorney, Agent, or Firm* — Lorenz & Kopf, LLP

(57) ABSTRACT

Embodiments of a gas turbine engine actuation system are provided, as are embodiments of a high temperature actuator and methods for the manufacture thereof. In one embodiment, the gas turbine engine actuation system includes an actuated gas turbine engine component and a high temperature actuator, which has a rotor mechanically linked to the actuated gas turbine engine component and a stator surrounding at least a portion of the rotor. The stator includes, in turn, a coil support structure having a plurality of spokes extending radially therefrom. A plurality of pre-formed electromagnetic coils is circumferentially distributed about the coil support structure. Each of the plurality of pre-formed electromagnetic coils is inserted over at least one of the plurality of spokes in a radial direction. The stator further includes an inorganic dielectric material in which each of the plurality of pre-formed electromagnetic coils is at least partially embedded.

14 Claims, 10 Drawing Sheets

(51) Int. Cl.

| | | |
|---|---|---|
| *F01D 17/16* | (2006.01) | |
| *F02K 1/76* | (2006.01) | |
| *F02C 7/042* | (2006.01) | |
| *F02C 7/32* | (2006.01) | |
| *F02C 9/20* | (2006.01) | |
| *F02C 9/54* | (2006.01) | |
| *H02K 3/30* | (2006.01) | |
| *H02K 3/34* | (2006.01) | |
| *H02K 5/10* | (2006.01) | |
| *H02K 15/02* | (2006.01) | |
| *H02K 5/12* | (2006.01) | |
| *H02K 3/47* | (2006.01) | |
| *H02P 3/00* | (2006.01) | |

(52) U.S. Cl.
CPC ............... *F02C 9/20* (2013.01); *F02C 9/54* (2013.01); *F02K 1/763* (2013.01); *H02K 1/146* (2013.01); *H02K 3/30* (2013.01); *H02K 3/345* (2013.01); *H02K 5/10* (2013.01); *H02K 15/02* (2013.01); *F05D 2270/62* (2013.01); *H02K 3/47* (2013.01); *H02K 5/12* (2013.01); *H02P 3/00* (2013.01); *Y02T 50/671* (2013.01); *Y10T 29/49012* (2015.01)

(58) Field of Classification Search
CPC .. H02K 3/34; H02K 3/345; H02K 5/08; H02K 5/12; H02K 5/128
USPC .......................................................... 310/43
See application file for complete search history.

(56) References Cited

U.S. PATENT DOCUMENTS

| | | | |
|---|---|---|---|
| 2,262,802 A | | 11/1941 | Hayden |
| 2,713,715 A | * | 7/1955 | Jenner ............... H02K 3/325 156/281 |
| 2,787,769 A | | 4/1957 | Hill et al. |
| 2,864,929 A | | 3/1958 | Schwing |
| 2,848,794 A | | 8/1958 | Roth |
| 2,879,361 A | | 3/1959 | Haynman |
| 2,904,619 A | | 9/1959 | Forney, Jr. |
| 2,944,235 A | | 7/1960 | Peters |
| 2,997,647 A | | 8/1961 | Gaugler et al. |
| 3,019,403 A | | 1/1962 | Kamm |
| 3,223,553 A | | 12/1965 | Morey |
| 3,256,417 A | | 6/1966 | Merrett |
| 3,308,411 A | | 3/1967 | Roshala |
| 3,308,414 A | | 3/1967 | Ostrander et al. |
| 3,336,553 A | | 8/1967 | Cripps |
| 3,352,009 A | | 11/1967 | Cohn et al. |
| 3,373,390 A | | 3/1968 | Rechel |
| 3,542,276 A | | 11/1970 | James |
| 3,638,055 A | * | 1/1972 | Zimmermann ........ H02K 5/128 264/272.19 |
| 3,688,397 A | | 9/1972 | Cleaver et al. |
| 3,694,785 A | | 9/1972 | Chass |
| 3,731,368 A | | 5/1973 | Dieteman et al. |
| 3,773,262 A | | 11/1973 | Sparling |
| 3,775,628 A | | 11/1973 | Andersson et al. |
| 3,812,580 A | | 5/1974 | Drugmand |
| 3,862,416 A | | 1/1975 | Phillips et al. |
| 3,868,766 A | * | 3/1975 | Gramlich ............ H01F 41/122 29/596 |
| 3,881,163 A | | 4/1975 | Lindroth et al. |
| 3,914,859 A | * | 10/1975 | Pierson ................ H02K 1/16 29/596 |
| 3,932,928 A | | 1/1976 | King |
| 3,961,151 A | | 6/1976 | Danner |
| 4,056,883 A | | 11/1977 | Danner |
| 4,057,187 A | | 11/1977 | Cranston et al. |
| 4,107,635 A | | 8/1978 | Brundage et al. |
| 4,135,296 A | | 1/1979 | Kami et al. |
| 4,196,510 A | | 4/1980 | Gudmestad et al. |
| 4,228,415 A | | 10/1980 | Schantz |
| 4,258,347 A | | 3/1981 | Konig |
| 4,376,904 A | | 3/1983 | Horrigan |
| 4,429,007 A | | 1/1984 | Bich et al. |
| 4,445,103 A | | 4/1984 | Chass |
| 4,476,192 A | | 10/1984 | Imai et al. |
| 4,524,624 A | | 6/1985 | Di Noia et al. |
| 4,528,086 A | | 7/1985 | Kato et al. |
| 4,554,730 A | | 11/1985 | Westervelt et al. |
| 4,621,251 A | | 11/1986 | Keefe |
| 4,636,763 A | | 1/1987 | Nabstedt et al. |
| 4,641,911 A | | 2/1987 | Pavlak et al. |
| 4,786,760 A | | 11/1988 | Friedhelm |
| 4,852,245 A | * | 8/1989 | Denk .................. H02K 3/47 29/596 |
| 4,866,573 A | | 9/1989 | Bernstein |
| 4,870,308 A | | 9/1989 | Sismour, Jr. |
| 4,950,438 A | | 8/1990 | Nakamura et al. |
| 5,030,877 A | * | 7/1991 | Denk .................. H02K 9/197 290/52 |
| 5,091,609 A | | 2/1992 | Sawada et al. |
| 5,105,531 A | | 4/1992 | Sawada et al. |
| 5,122,506 A | | 6/1992 | Wang |
| 5,140,292 A | | 8/1992 | Aronow |
| 5,158,826 A | * | 10/1992 | Ihlein .................. C08G 59/24 428/324 |
| 5,211,789 A | | 5/1993 | Christian et al. |
| 5,226,220 A | | 7/1993 | Gevas et al. |
| 5,460,503 A | | 10/1995 | Kitajima et al. |
| 5,463,522 A | | 10/1995 | Van Wagener et al. |
| 5,475,203 A | | 12/1995 | McGaffigan |
| 5,493,159 A | | 2/1996 | Norris |
| 5,497,936 A | | 3/1996 | Vojta et al. |
| 5,636,434 A | | 6/1997 | Okey et al. |
| 5,666,099 A | | 9/1997 | Ostrem |
| 5,675,891 A | | 10/1997 | Childs et al. |
| 5,693,208 A | | 12/1997 | Paulet |
| 5,815,091 A | | 9/1998 | Dames et al. |
| 5,956,839 A | * | 9/1999 | Miller .................. H02K 15/00 29/447 |
| 5,982,056 A | * | 11/1999 | Koyama .............. C08G 59/38 310/216.001 |
| 6,009,141 A | | 12/1999 | Hell et al. |
| 6,028,386 A | * | 2/2000 | Kech .................. H02K 3/47 310/194 |
| 6,038,760 A | | 3/2000 | Antoine et al. |
| 6,189,202 B1 | | 2/2001 | Masuda et al. |
| 6,261,437 B1 | | 7/2001 | Hernnaes et al. |
| 6,304,018 B1 | * | 10/2001 | Ham .................. H02K 1/12 310/216.048 |
| 6,368,485 B1 | | 4/2002 | Ue et al. |
| 6,668,067 B2 | | 12/2003 | Suzuki |
| 6,750,749 B2 | | 6/2004 | Horiuchi et al. |
| 6,847,145 B2 | | 1/2005 | Van Dine et al. |
| 6,856,065 B2 | * | 2/2005 | Suzuki ............... H02K 1/185 310/216.074 |
| 6,909,279 B2 | | 6/2005 | Niwa |
| 6,927,666 B2 | | 8/2005 | Ahn et al. |
| 6,976,308 B2 | | 12/2005 | Jonli |
| 7,096,657 B2 | * | 8/2006 | Mahoney .............. F01D 17/162 415/150 |
| 7,129,605 B2 | | 10/2006 | Zhang et al. |
| 7,147,500 B2 | | 12/2006 | Tabata et al. |
| 7,147,929 B2 | | 12/2006 | Amagi et al. |
| 7,250,704 B1 | * | 7/2007 | Sortore ................ H01F 27/323 310/208 |
| 7,289,012 B2 | | 10/2007 | Tran-Ngoc et al. |
| 7,365,627 B2 | | 4/2008 | Yen et al. |
| 7,394,022 B2 | | 7/2008 | Gumley |
| 7,459,817 B2 | | 12/2008 | VanLuik et al. |
| 7,513,029 B2 | * | 4/2009 | Ortt .................. H02K 15/0435 29/596 |
| 7,572,980 B2 | | 8/2009 | Elie et al. |
| 7,588,530 B2 | | 9/2009 | Heilman et al. |
| 7,645,522 B2 | | 1/2010 | Bischoff et al. |
| 7,705,265 B2 | | 4/2010 | Asakura et al. |
| 7,795,538 B2 | | 9/2010 | Kaiser et al. |

(56) References Cited

U.S. PATENT DOCUMENTS

| | | | |
|---|---|---|---|
| 7,893,583 B2 | 2/2011 | Du et al. | |
| 7,947,905 B2 | 5/2011 | Pasini | |
| 8,058,881 B2 | 11/2011 | Engbring et al. | |
| 8,128,441 B2 | 3/2012 | Mukuno | |
| 8,205,786 B1 * | 6/2012 | Holden | H01R 4/022 |
| | | | 228/136 |
| 8,253,299 B1 | 8/2012 | Rittenhouse | |
| 8,581,452 B2 | 11/2013 | Roopnarine | |
| 9,009,949 B1 * | 4/2015 | Thaxton | H02K 15/12 |
| | | | 29/596 |
| 2001/0017923 A1 | 8/2001 | Suzuki | |
| 2003/0010813 A1 | 1/2003 | Nakaya | |
| 2003/0020344 A1 | 1/2003 | Futami et al. | |
| 2003/0074884 A1 | 4/2003 | Snow et al. | |
| 2004/0010908 A1 | 1/2004 | Kobayashi | |
| 2004/0140293 A1 | 7/2004 | Kohama et al. | |
| 2004/0158981 A1 | 8/2004 | Antaya et al. | |
| 2005/0012423 A1 | 1/2005 | Yasuhara et al. | |
| 2005/0127774 A1 | 6/2005 | Sogabe et al. | |
| 2005/0225418 A1 | 10/2005 | Tran-Ngoc et al. | |
| 2007/0279047 A1 | 12/2007 | Schumacher | |
| 2008/0007134 A1 * | 1/2008 | Shimura | H02K 3/44 |
| | | | 310/214 |
| 2009/0121896 A1 | 5/2009 | Mitchell et al. | |
| 2009/0206974 A1 | 8/2009 | Meinke | |
| 2009/0255319 A1 | 10/2009 | Sokol | |
| 2009/0273254 A1 | 11/2009 | Heim | |
| 2009/0325809 A1 | 12/2009 | Hong et al. | |
| 2010/0018768 A1 | 1/2010 | Takahashi et al. | |
| 2010/0031497 A1 | 2/2010 | Saka et al. | |
| 2010/0176683 A1 | 7/2010 | Waddell et al. | |
| 2010/0189884 A1 | 7/2010 | Kaiser et al. | |
| 2011/0054584 A1 | 3/2011 | Alexander et al. | |
| 2011/0080062 A1 | 4/2011 | Noh et al. | |
| 2011/0192451 A1 | 8/2011 | Sato et al. | |
| 2012/0126642 A1 | 5/2012 | Miyamoto et al. | |
| 2012/0169174 A1 | 7/2012 | Radov et al. | |
| 2012/0175991 A1 | 7/2012 | Tassinario et al. | |
| 2013/0082809 A1 | 4/2013 | Holden et al. | |
| 2013/0093550 A1 * | 4/2013 | Piascik | H01F 5/04 |
| | | | 335/299 |
| 2013/0285777 A1 | 10/2013 | Piascik et al. | |
| 2014/0039258 A1 | 2/2014 | Sekiguchi et al. | |

FOREIGN PATENT DOCUMENTS

| | | | | |
|---|---|---|---|---|
| DE | 3830740 A1 | | 3/1990 | |
| DE | 102007034322 A1 | | 1/2009 | |
| DE | 102010001888 A1 | | 8/2010 | |
| EP | 0012422 A1 | | 6/1980 | |
| EP | 0886053 A2 | | 12/1998 | |
| FR | 2903246 A1 | | 1/2008 | |
| GB | 147786 | | 4/1921 | |
| GB | 569196 | | 5/1945 | |
| GB | 719126 A | | 11/1954 | |
| GB | 720076 | * | 12/1954 | H02K 3/32 |
| JP | 5293904 | * | 8/1977 | H02K 15/12 |
| JP | 54122803 | * | 9/1979 | H02K 3/36 |
| JP | 56123749 | * | 9/1981 | H02K 3/32 |
| JP | 63209443 A | | 8/1988 | |
| JP | 04137516 A | | 5/1992 | |
| JP | 2005183554 A | | 7/2005 | |
| JP | 2008288512 A | | 11/2008 | |
| JP | 2012-105392 | | 5/2012 | |

OTHER PUBLICATIONS

EPO, European Search Report for Application No. 12175199.4, dated Oct. 17, 2012.
Chaklader, et al. "Alumina fibre from aluminium wire, ScienceDirect.com—Composites—Alumina fibre from aluminium wire." Retrieved on Apr. 4, 2012. Retrieved from internet URL<http://www.sciencedirect.com/science/article/pii/0010436181900173.
USPTO Notice of Allowance for U.S. Appl. No. 13/038,838 dated Jul. 1, 2013.

* cited by examiner

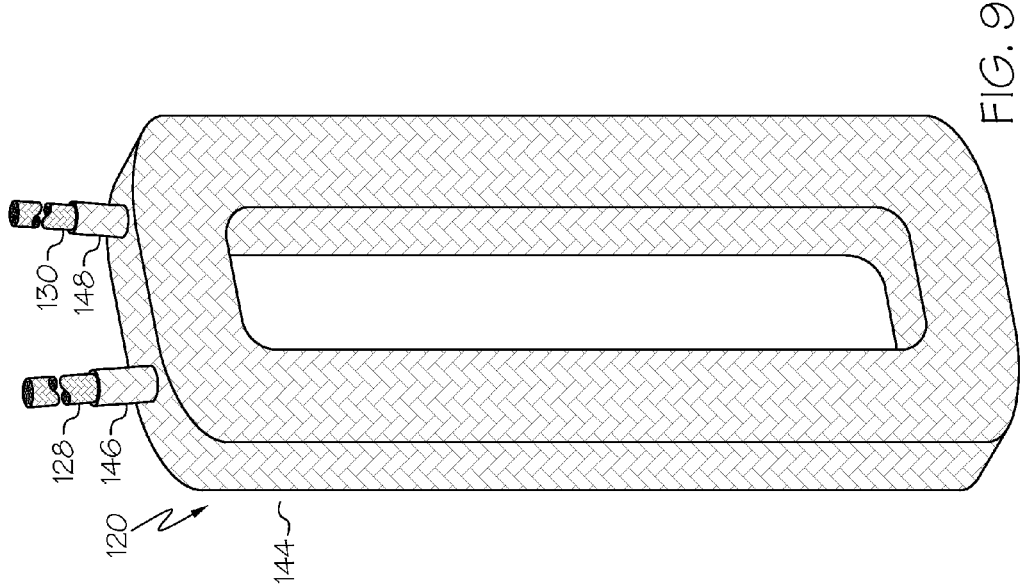
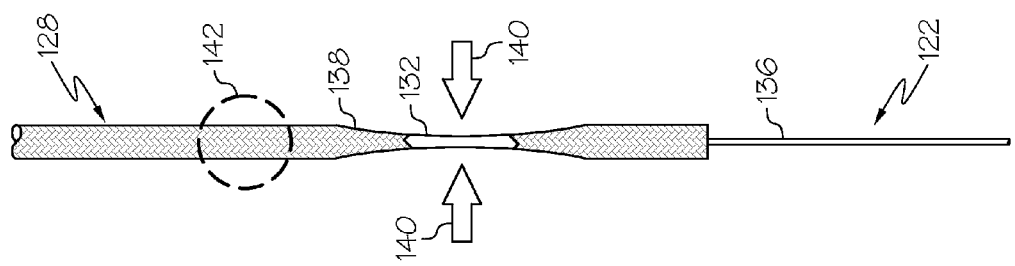

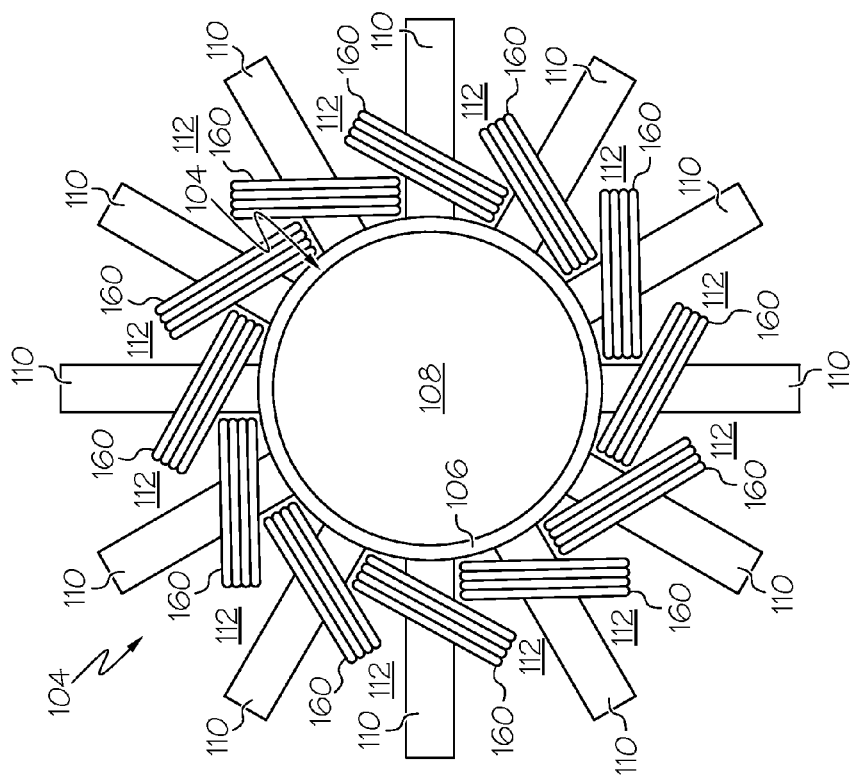
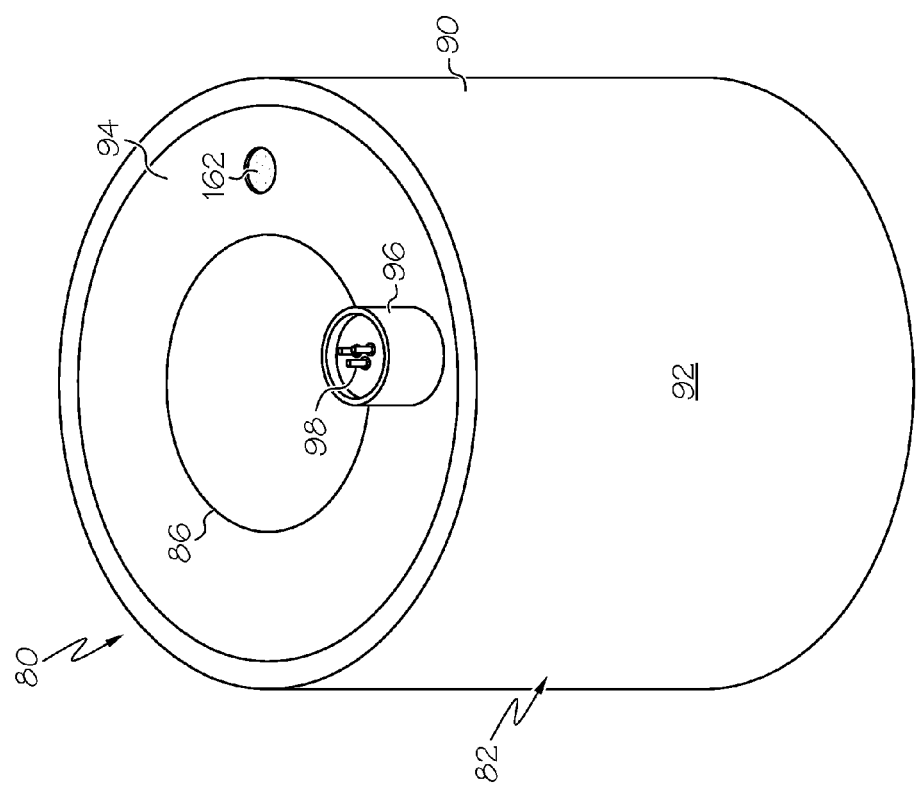
FIG. 14
FIG. 13

GAS TURBINE ENGINE ACTUATION SYSTEMS INCLUDING HIGH TEMPERATURE ACTUATORS AND METHODS FOR THE MANUFACTURE THEREOF

TECHNICAL FIELD

The present invention relates generally to gas turbine engines and, more particularly, to gas turbine engine actuation systems including high temperature actuators, as well as to methods for fabricating high temperature actuators suitable for usage in avionic and non-avionic applications.

BACKGROUND

Gas turbine engines are commonly equipped with electric motor-based actuators (referred to herein as "motor actuators"), which are utilized to adjust certain movable components during engine operation. The maximum temperature capabilities of motor actuators can be limited due to the usage of organic dielectric materials to provide electrical insulation between windings within the stator. Polyimide, polytetrafluoroethylene, polyvinyl chloride, and other organic polymers commonly utilized as dielectric coating and/or potting materials tend to breakdown and decompose at highly elevated temperatures exceeding, for example, about 260° C. In the vast majority of applications, the temperature limitations of the motor actuator are immaterial as the motor actuator is exposed to temperatures well-below such thermal extremes. Even when motor actuators are utilized within a gas turbine engine, the engine design can typically be adapted to spatially offset or otherwise thermally insulate the motor actuators from exposure to the highest temperatures generated during engine operation. This notwithstanding, efficiencies in gas turbine engine design can be obtained in certain instances by disposition of motor actuators in the hot section of a gas turbine engine and/or by operation of the gas turbine engine at higher core temperatures at which the thermal capabilities of conventional motor actuators can be undesirably limited.

There thus exists an ongoing need to provide embodiments of an electric motor-based actuator suitable for operation in high temperature applications characterized by maximum temperatures exceeding, for example, about 260° C. It would be desirable for such motor actuators to be useful for employment in both avionic and non-avionic applications. With respect to avionic applications, in particular, it would be desirable for such high temperature motor actuators to be relatively lightweight, compact, and insensitive to vibratory forces and, therefore, well-suited for usage within gas turbine engine actuation systems. Finally, it would be desirable to provide embodiments of a method for fabricating such high temperature motor actuators. Other desirable features and characteristics of the present invention will become apparent from the subsequent Detailed Description and the appended Claims, taken in conjunction with the accompanying Drawings and the foregoing Background.

BRIEF SUMMARY

Embodiments of a gas turbine engine actuation system are provided. In one embodiment, the gas turbine engine actuation system includes an actuated gas turbine engine component and a high temperature actuator, which has a rotor mechanically linked to the actuated gas turbine engine component and a stator surrounding at least a portion of the rotor. The stator includes, in turn, a coil support structure having a plurality of spokes extending radially therefrom. A plurality of pre-formed electromagnetic coils is circumferentially distributed about the coil support structure. Each of the plurality of pre-formed electromagnetic coils is inserted over at least one of the plurality of spokes in a radial direction. The stator further includes an inorganic dielectric material in which each of the plurality of pre-formed electromagnetic coils is at least partially embedded.

Embodiments of a high temperature actuator are further provided. In one embodiment, the high temperature actuator includes a rotor mechanically linked to the actuated gas turbine engine component and a stator surrounding at least a portion of the rotor. The stator includes, in turn, a coil support structure having a plurality of spokes extending radially therefrom. A plurality of pre-formed electromagnetic coils is circumferentially distributed about the coil support structure. Each of the plurality of pre-formed electromagnetic coils is inserted over at least one of the plurality of spokes in a radial direction. The stator further includes an inorganic dielectric material in which each of the plurality of pre-formed electromagnetic coils is at least partially embedded.

Embodiments of a method for manufacturing a high temperature actuator are still further provided. In one embodiment, the method includes providing a coil support structure comprising a plurality of spokes extending radially from a tubular body. A plurality of pre-formed wire coils is inserted over the plurality of spokes in a radial direction. The plurality of pre-formed wire coils are embedded in an inorganic dielectric material before or after insertion of the plurality of pre-formed wire coils over the plurality of spokes. A cylindrical casing is disposed around the coil support structure to circumferentially enclose the plurality of pre-formed wire coils. A cover piece is then joined to the coil support structure and the cylindrical casing to hermitically enclose the plurality of pre-formed wire coils. Prior to joining the cover piece to the coil support structure and the cylindrical casing, the plurality of pre-formed wire coils are electrically coupled to the conductors of a feedthrough assembly.

BRIEF DESCRIPTION OF THE DRAWINGS

At least one example of the present invention will hereinafter be described in conjunction with the following figures, wherein like numerals denote like elements, and:

FIG. 8 illustrates one manner in which an end portion of a wound magnet wire included in the pre-formed electromagnetic coil shown in FIGS. 6 and 7 may be joined to a braided lead wire in at least some implementations of the exemplary fabrication method;

FIG. 9 is an isometric view of the encapsulated, pre-formed electromagnetic coil shown in FIGS. 6 and 7 after an electrically-insulative covering has been wrapped around the dielectric body encapsulating the electromagnetic coil and after electrically-insulative sleeves have been disposed over the braided lead wires projecting from the dielectric body;

FIGS. 10-13 are isometric views of the exemplary high temperature actuator shown in FIG. 2 shown at various stages of completion, as fabricated in accordance with the exemplary method set-forth in FIG. 3; and FIG. 14 is a top-down view illustrating one manner in which a number of non-encapsulated pre-formed electromagnetic coils can be fit onto a spoked stator support structure in alternative embodiments of the exemplary fabrication method.

DETAILED DESCRIPTION

Figure 1:
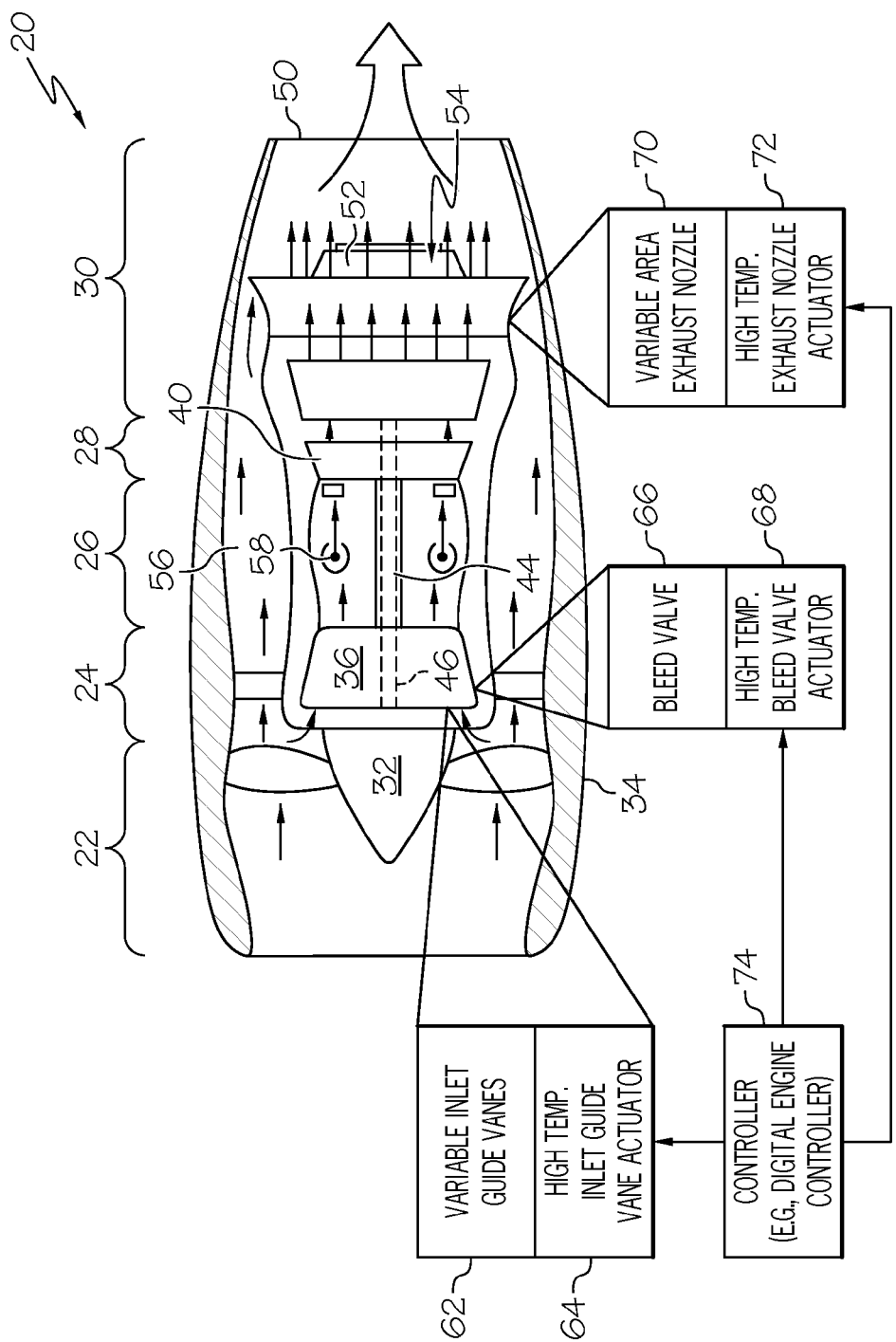
FIG. 1 schematically illustrates an exemplary gas turbine engine having a number of gas turbine engine actuation systems each including at least one high temperature motor actuator, which can be produced in accordance with an embodiment of the manufacturing method described herein.

The following Detailed Description is merely exemplary in nature and is not intended to limit the invention or the application and uses of the invention. Furthermore, there is no intention to be bound by any theory presented in the preceding Background or the following detailed description.

It has been recognized that the operational temperature limits of devices employing electromagnetic coils can be increased by utilizing inorganic dielectric materials to provide electrical insulation between the wire coils and the other electrically-conductive device components. Several co-pending patent applications have been filed and assigned to the Assignee of this Application, Honeywell International Inc., describing the usage of such inorganic dielectric materials, such as inorganic cements and borosilicate glasses, in the production of solenoids and other electromagnetic coil assemblies. It has also been recognized that additional benefits can be achieved by utilizing anodized aluminum wire in forming the wound coil or coils of such a high temperature electromagnetic coil assembly or device. However, certain challenges are presented when integrating such inorganic dielectric materials and anodized aluminum wire, or another type of magnet wire, into the wound stator of an electric motor. Introduction and complete filling of the interior of the stator with cement, glass, or a similar inorganic dielectric material can be difficult, especially when the stator includes a relatively compact and hermetically-enclosed housing. Furthermore, when utilizing anodized aluminum wire lacking a conventional organic-based insulative coating as the magnet wire, winding of the magnet wire around the spokes, fins, or arms of the stator can result in abrasion of the wire's aluminum oxide shell, which may increase the likelihood of shorting.

To overcome the above-noted difficulties, the following describes embodiments of a manufacturing process wherein a number of pre-formed coils are fabricated independently of the stator and then assembled onto a circumferentially-open spoked coil support structure included within the housing assembly of the stator. The pre-formed coils are preferably formed utilizing anodized aluminum wire; however, various other types of magnet wire can be utilized, as well, including silver wire. In certain embodiments, the pre-formed coils are encapsulated or embedded in an inorganic dielectric material prior to insertion onto the spoked coil support structure. In this case, the encapsulated pre-formed coils are preferably formed utilizing a wet winding process or a molding process of the type described below, which yields a generally annular potted coil that, when hardened by full or partial curing, can easily be inserted onto the arms or spokes of the coil support structure with minimal physical manipulation. In alternative embodiments, the pre-formed coils may be fitted onto the spoked coil support structure prior to encapsulation and, at a later juncture in the fabrication process, the stator housing assembly may be infiltrated with an inorganic dielectric material. In either case, the inorganic dielectric material may be initially applied in a wet or flowable state and subsequently hardened by thermal curing before or after positioning around the spokes of the coil support structure. While the possibility that the motor actuator may contain organic materials is by no means precluded, in preferred embodiments, the resulting motor actuator is devoid of organic materials and capable of providing prolonged operation at temperatures approaching or exceeding the temperature thresholds at which conventional organic materials decompose and breakdown; e.g., temperatures exceeding about 260° C. Embodiments of the high temperature motor actuator described herein are consequently well-suited for usage within gas turbine engine actuation systems; however, embodiments of the high temperature motor actuator can be utilized within any application wherein increased operational temperatures limits are desired including, but not limited to, nuclear, oil drilling, and other non-avionic applications.

FIG. 1 is a simplified cross-sectional view of an exemplary gas turbine engine (GTE) 20. By way example, GTE 20 is illustrated in FIG. 1 as a two spool turbofan engine including an intake section 22, a compressor section 24, a combustion section 26, a turbine section 28, and an exhaust section 30. Intake section 22 includes an intake fan 32 mounted in a nacelle assembly 34. In the illustrated example, compressor section 24 includes a single axial compressor 36, which is rotatably disposed within an engine case 38 mounted within nacelle assembly 34. Turbine section 28 includes a high pressure (HP) turbine 40 and a low pressure (LP) turbine 42, which are rotatably disposed within engine case 38 in flow series. Compressor 36 and HP turbine 40 are mounted to opposing ends of an HP shaft 44, and intake fan 32 and LP turbine 42 are mounted to opposing ends of a LP shaft 46. LP shaft 46 and HP shaft 44 are co-axial; that is, LP shaft 46 extends through a longitudinal channel provided through HP shaft 44. Engine case 38 and nacelle assembly 34 terminate in a mixer nozzle 48 and a propulsion nozzle 50, respectively. Mixer nozzle 48 cooperates with a centerbody 52 to form an exhaust mixer 54, which mixes hot combustive gas flow received from turbine section 28 with cooler bypass airflow during operation of GTE 20.

As illustrated in FIG. 1 and described herein, GTE 20 is offered by way of non-limiting example only. It will be readily appreciated that turbine nozzles of the type described herein can be utilized within various other types of gas turbine engine including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application. With respect to exemplary GTE 20, in particular, it is noted that the particular structure of GTE 20 will inevitably vary amongst different embodiments. For example, in certain embodiments, GTE 20 may include an exposed intake fan (referred to as an "open rotor configuration") or may not include an intake fan. In other embodiments, GTE 20 may employ centrifugal compressors or impellers in addition to or in lieu of axial compressors. In still further embodiments, GTE 20 may include a single shaft or three or more shafts along with varying numbers of compressors and turbines.

During operation of GTE 20, air is drawn into intake section 22 and accelerated by intake fan 32. A portion of the accelerated air is directed through a bypass flow passage 56, which is provided between nacelle assembly 34 and engine case 38 and conducts this airflow over and around engine case 38. The remaining portion of air exhausted from intake fan 32 is directed into compressor section 24 and compressed by compressor 36 to raise the temperature and pressure of the core airflow. The hot, compressed airflow is supplied to combustion section 26 wherein the air is mixed with fuel and combusted utilizing one or more combustors 58 included within section 26. The combustive gasses expand rapidly and flow through turbine section 28 to drive the rotation of HP turbine 40 and LP turbine 42. One or more non-illustrated turbine nozzles may be provided to further accelerate the combustive gas flow and to impart the gas flow with a desired tangential component prior to impingement upon the rotating blades of HP turbine 40. The rotation of turbines 40 and 42 drives the rotation of shafts 44 and 46, respectively, which, in turn, drives the rotation of compressor 36 and intake fan 32. The rotation of shafts 44 and 46 also provides significant power output, which may be utilized in a variety of different manners, depending upon whether GTE 20 assumes the form of a turbofan, turboprop, turboshaft, turbojet engine, or an auxiliary power unit, to list but a few examples. After flowing through turbine section 28, the combustive gas flow is then directed into exhaust section 30 wherein mixer 54 mixes the combustive gas flow with the cooler bypass air received from bypass flow passages 56. Finally, the combustive gas flow is exhausted from GTE 20 through propulsion nozzle 50 to produce forward thrust, although this may not be the case in alternative embodiments wherein GTE 20 assumes the form of, for example, a turboshaft engine.

GTE 20 may include any number of movable components that are adjusted during engine operation by electric actuators, which are, in turn, controlled by one or more controllers. Depending upon the particular type of actuated component, the electric actuators may assume the form of, for example, electric motors having rotary outputs (referred to herein as "motor actuators" and distinguished from electric actuators having linear outputs, such as solenoids). The electric motor may be, for example, a wound-stator type motor containing a series of windings or electromagnetic coils disposed within a number of circumferentially-spaced slots provided within the stator housing assembly. As indicated in the foregoing section entitled "BACKGROUND," polymers or other organic insulative coatings are conventionally utilized to electrically insulate the electromagnetic coils disposed within the stator of the motor actuator. Such organic dielectric materials are readily available and can provide adequate electrical insulation at low to moderate operating temperatures; however, at highly elevated temperatures exceeding, for example, about 260° C., organic dielectric materials tend to breakdown and decompose. For this and other reasons, the operational temperature capabilities of conventional actuators can be undesirably limited for usage in environments characterized by highly elevated temperatures.

In the case of actuators utilized within gas turbine engine actuation systems, the motor actuator can often be remotely located or otherwise thermally insulated from the most severe temperatures generated during engine operation. However, this may not always be the case. In certain instances, it may be desirable to locate the motor actuator within highly heated regions of the gas turbine engine, such as in the hot section of the gas turbine engine, wherein the temperature may surpass the thermal operating limits of conventional motor actuators. To further emphasize this point, FIG. 1 schematically illustrates GTE 20 as incorporating three gas turbine engine actuation systems, which may each include at least one motor actuator that, if mounted or otherwise disposed in close proximity to the component or components adjusted by the actuator, may be subject to prolonged exposure to highly elevated temperatures generated during operation of the gas turbine engine. In particular, as schematically illustrated in FIG. 1, exemplary GTE 20 may include: (i) a variable inlet guide vane actuation system 62, 64; (ii) a bleed valve actuation system 66, 68; and (iii) a variable area exhaust nozzle actuation system 70, 72. These exemplary gas turbine engine actuation systems are each described, in turn, below.

The gas turbine engine actuation systems shown in FIG. 1 each include a motor actuator 64, 68, and 72 having enhanced operational temperature capabilities. High temperature motor actuators 64, 68, and 72 can thus be disposed within the high temperature zones of GTE 20, and potentially subject to direct exposure to combustive gas flow, to allow greater flexibility in gas turbine engine design and/or allow GTE 20 to be operated at higher core temperatures to achieve improvements in fuel consumption and efficiency. In the case of variable inlet guide vane actuation system 62, 64, the high temperature actuator assumes the form of an inlet guide vane actuator 64. Inlet guide vane actuator 64 is utilized to selectively adjust the orientation of a number of variable inlet guide vanes 62, which are positioned within one or more compressor stages of compressor section 24 in the conventionally-known manner. In the case of bleed valve actuation system 66, 68, the high temperature actuator assumes the form of a bleed valve actuator 68, which is utilized to adjust the position of a bleed valve 66 fluidly coupled to compressor section 24 to regulate the flow of airflow bled from the high pressure compressor section of GTE 20. Lastly, in the case of variable area exhaust nozzle actuation system 70, 72, the high temperature actuator assumes the form of an exhaust nozzle actuator 72, which is utilized to vary the flow area of a variable area exhaust nozzle 70 to control the outflow characteristics thereof. As further indicated in FIG. 1, the operation of high temperature actuators 64, 68, and 72 may be controlled by a common controller 74, such as a Full Authority Digital Engine Controller ("FADEC") or other digital engine controller.

Figure 2:
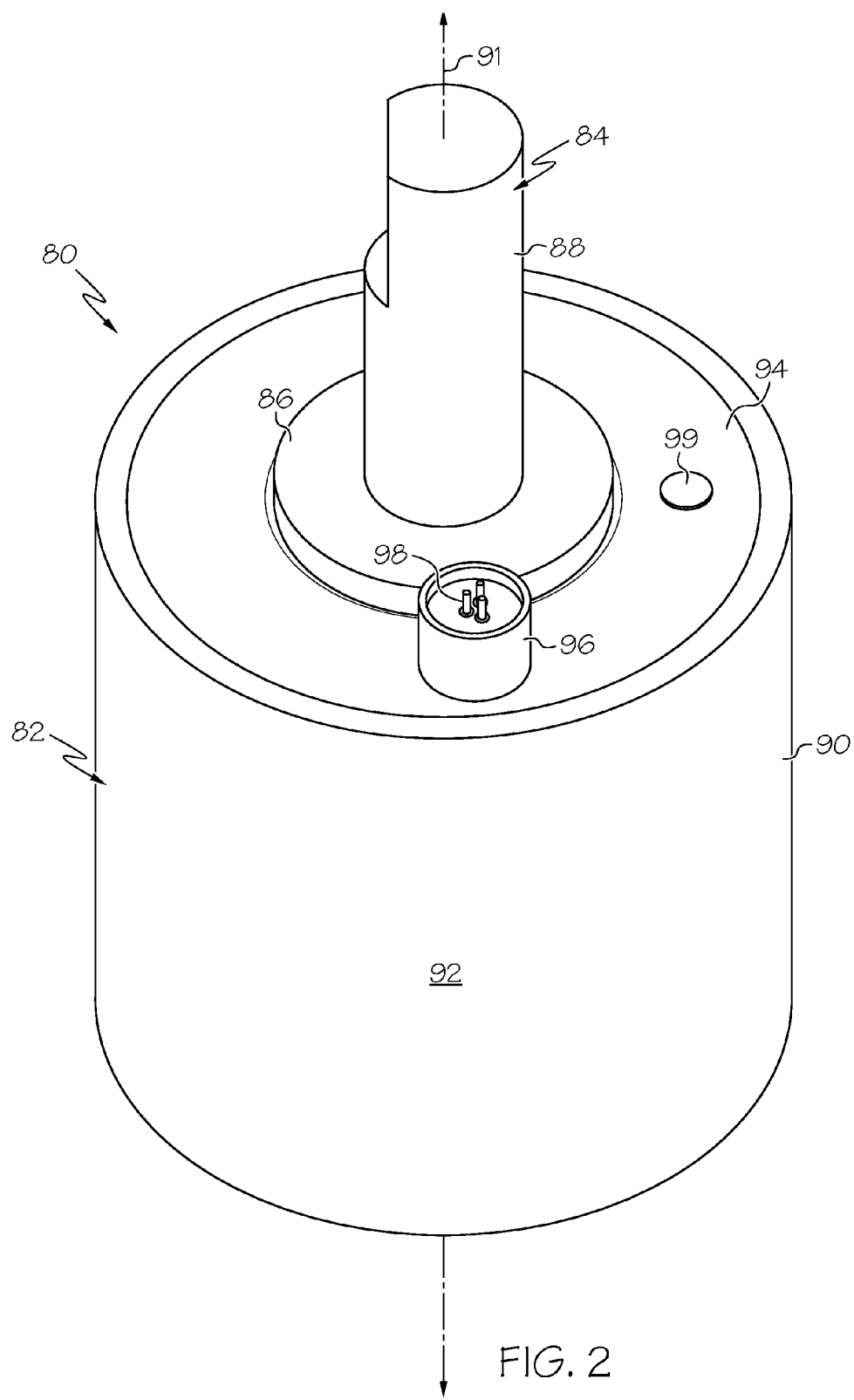
FIG. 2 is an isometric view of a high temperature actuator suitable for usage within one or more of the gas turbine engine actuation systems shown in FIG. 1 and illustrated in accordance with an exemplary embodiment of the present invention.

FIG. 2 is an isometric view of a high temperature motor actuator 80 suitable for usage as one or all of the high temperature actuators 64, 68, and 72 shown in FIG. 1. In the exemplary embodiment shown in FIG. 2, motor actuator 80 includes two main components or assemblies: (i) a wound stator 82 (that is, a stator containing a number of wound coils), and (ii) and a rotor 84. Rotor 84 includes a core 86, which extends into a central opening or bore provided within wound stator 82 and can rotate relative to stator 82 about motor centerline 91. Core 86 of rotor 84 is thus surrounded by or circumscribed by stator 82. Core 86 may contain any suitable arrangement of ferromagnetic structures and/or permanent magnets to permit magnetic interaction between rotor 84 and the electromagnetic coils contained within stator 82 (described below) in the well-known manner. A shaft 88 is affixed or integrally formed with core 86 and extends axially outward therefrom to provide the rotary output of motor actuator 80. Rotor 84, and specifically shaft 88, can be mechanically linked to one or more actuated component or components of a gas turbine engine, such as variable inlet guide vales 62, bleed valve 66, or variable area exhaust nozzle 70 (FIG. 1), either directly or utilizing any number of intervening components.

With continued reference to FIG. 2, wound stator 82 includes a housing assembly 90, which contains a number of pre-formed, dielectric-encapsulated windings or coils circumferentially spaced about centerline 91 of stator 82 (hidden from view in FIG. 2 and described in detail below). Stator housing assembly 90 may be hermetically sealed to prevent the ingress of moisture or other contaminants into the interior of stator 82. For example, housing assembly 90 may include a cylindrical casing 92 having an inner cavity in which the electrically-insulated windings are disposed; and a cover piece 94, such as a disk-shaped end plate, which may be welded to or otherwise sealingly affixed over the open end of casing 92 to enclose the inner cavity thereof. A feedthrough connector 96 having a number electrically-conductive pins 98 may be provided to provide electrical connection to the electromagnetic coils contained within stator housing assembly 90 without compromising the hermetic environment therein. Lastly, a disc-shaped plug 99 may be utilized to seal a fill opening provided in cover piece 94, which allows filling with a dielectric potting material to eliminate any voids remaining within the interior of housing assembly 90 after attachment of cover piece 94, as described more fully below in conjunction with FIG. 13.

Figure 3:
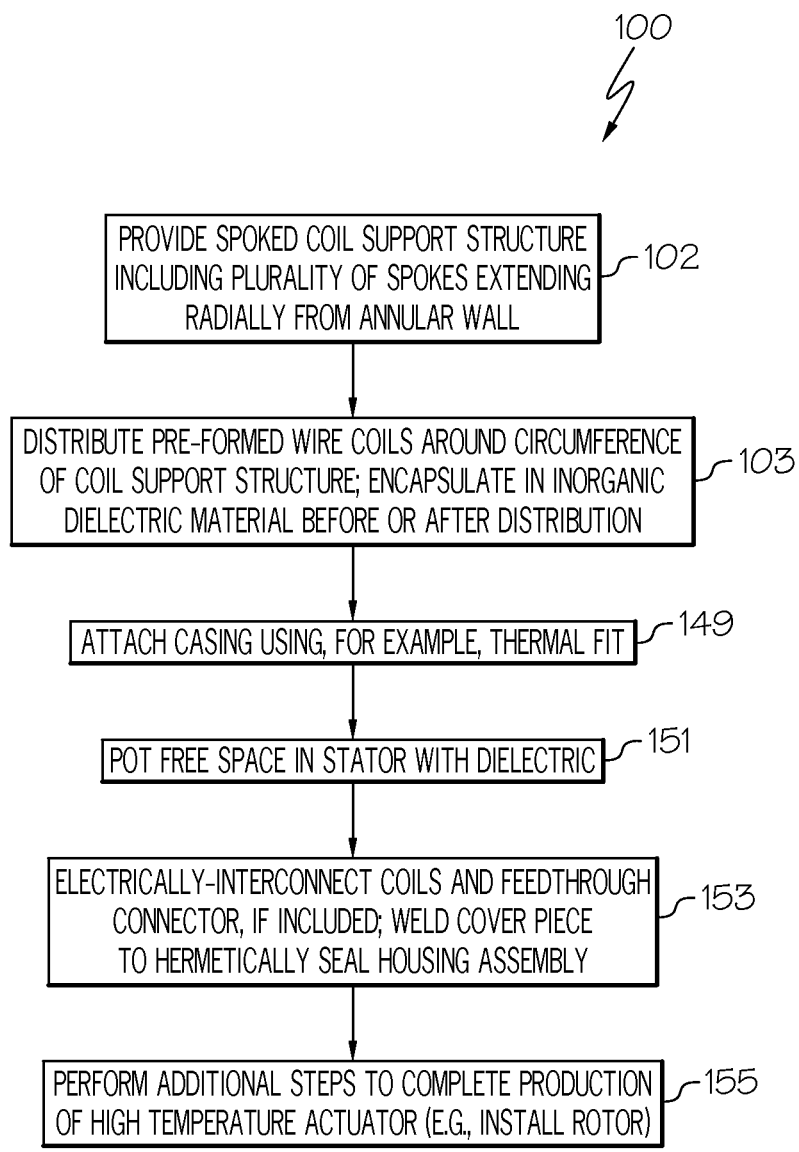
FIG. 3 is a flowchart setting-forth an exemplary method for manufacturing a high temperature actuator, such as the high temperature actuator shown in FIG. 2.

FIG. 3 is a flowchart setting-forth a method 100 for fabricating a high temperature motor actuator, as illustrated in accordance with an exemplary embodiment. To provide a convenient, albeit non-limiting example, the following describes fabrication method 100 in conjunction with high temperature motor actuator 80 shown in FIG. 2 and further shown at various stages of completion in FIGS. 4-13. This example notwithstanding, it is emphasized that embodiments of the below-described fabrication method can be utilized to produce various different types of high temperature actuators, which may differ in structure and function as compared to motor actuator 80. It should also be appreciated that the fabrication steps described below in conjunction with FIGS. 3-13 can be performed in alternative orders, that certain steps may be omitted, and that additional steps may be performed in alternative embodiments of the fabrication method.

Figure 5:
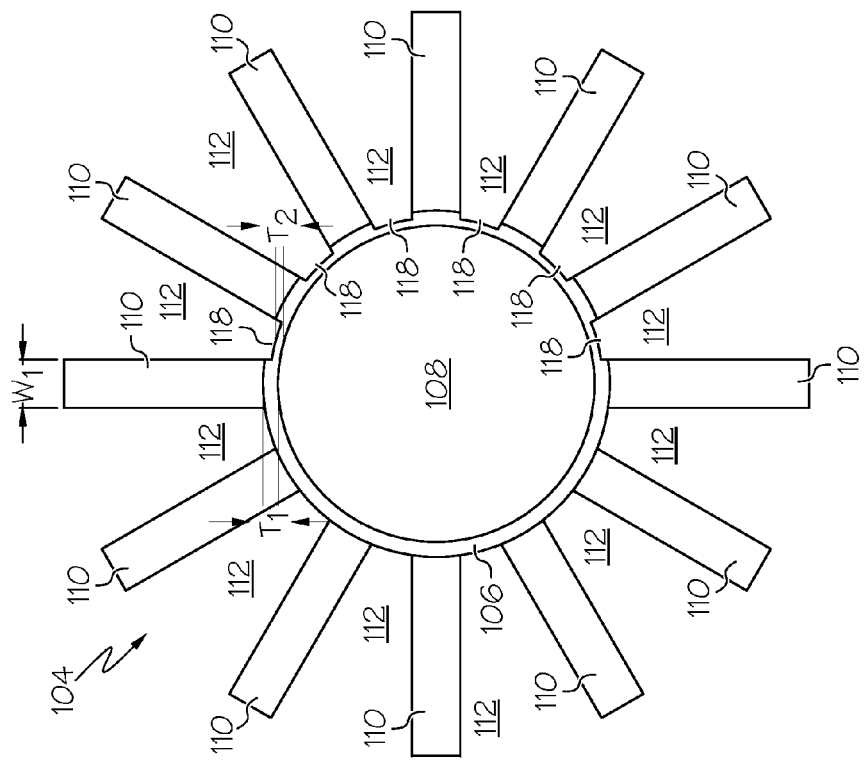
FIGS. 4 and 5 are isometric and top-down views, respectively, of an exemplary spoked coil support structure suitable for inclusion in the high temperature actuator produced pursuant to the exemplary fabrication method set-forth in FIG. 3.
Figure 4:
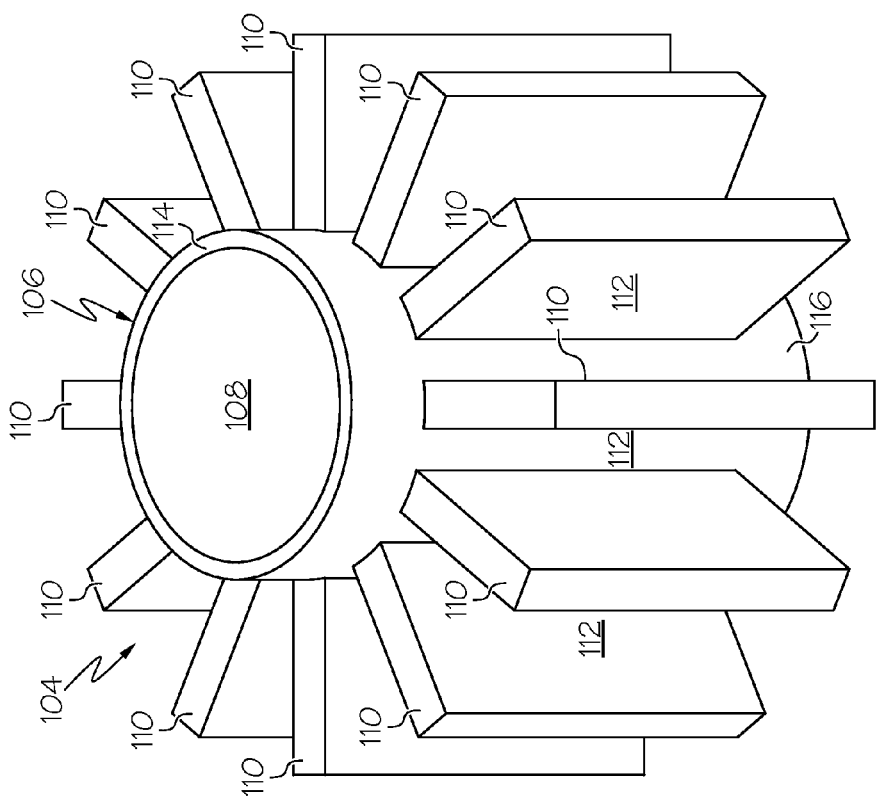

Exemplary method 100 commences with the provision of a spoked coil support structure (STEP 102, FIG. 3). FIGS. 4 and 5 are isometric and top-down views, respectively, of an exemplary spoked coil support structure 104 that may be obtained during STEP 102 (FIG. 1), whether by independent fabrication or by purchase from a third party supplier. In the illustrated example shown in FIGS. 4 and 5, spoked coil support structure 104 assumes the form of an inner annular wall or elongated tubular body 106. A central channel 108 extends through tubular body 106 along the longitudinal axis or centerline thereof, although it will be appreciated that channel 108 need not extend entirely through body 106 in all embodiments. A plurality of projections or spokes 110 extends radially outward from tubular body 106 and are circumferentially-spaced about the centerline or longitudinal axis of coil support structure 104. Collectively, spokes 110 and tubular body 106 define a number of circumferentially-spaced stator slots 112, which accommodate a number of pre-formed electromagnetic coils fitted onto coil support structure 104, as described more fully below in conjunction with FIG. 10. Each slot 112 is laterally bounded by the facing sidewalls of two adjacent spokes 110 and may have a generally trapezoidal shape, when viewed from either end of coil support structure 104. In the illustrate example, each spoke 110 assumes the form of a longitudinally-elongated wall, spine, or fin, which extends along an axis substantially parallel with the centerline of support structure 104; however, spokes 110 may assume any structural form or shape suitable for receiving and retaining a plurality of pre-formed electromagnetic coils in their desired positions in the below-described manner. To improve the efficiency of high temperature motor actuator 80, the portions of tubular body 106 of extending between radially-extending spokes 110 may be imparted with a decreased radial thickness. For example, in some embodiments, the radial thickness of tubular body 106 (identified in FIG. 5 as "$T_1$") may be less than, and preferably less than one half, the width of spokes 110 (identified in FIG. 5 as "$W_1$"). In one embodiment, $T_1$ may be between about 5 and about 20 millimeters. If desired, as indicated on the right hand side of FIG. 5, longitudinal channels 118 may be cut into or otherwise formed in tubular body 106 between spokes 110 to further reduce the thickness of the bridging portions of body 106 (identified in FIG. 5 as "W2").

Spoked coil support structure 104 is circumferentially open; that is, radial spokes 110 are each supported by or attached to tubular body 106 at one end (the inner terminal spoke end in the illustrated example) with the outer terminal spoke end terminating in free space. As the outer terminals ends of spokes 110 are not interconnected by an outer wall or similar structure, stator slots 112 are exposed and accessible from the outer circumference of support structure 104. Such a configuration allows the pre-formed electromagnetic coils to be fit onto coil support structure 104 with minimal physical manipulation. As can be seen most easily in FIG. 4, the uppermost circumferential edge 114 of tubular body 106 may extend beyond spokes 110 and the lowermost circumferential edge 116 of body 106 may extend beyond spokes 110 in opposing longitudinal directions to allow the pre-formed electromagnetic coils to wrap around radial spokes 110, as described below in conjunction with FIG. 10. The extension of upper edge 115 longitudinally beyond spokes 110 may also facilitate attachment of a cover piece, such as an end plate of the type described below in conjunction with FIG. 13.

In further embodiments, the spoked coil support structure may include a plurality of fins or spokes that are joined by an outer annular wall and that extend radially inward therefrom. In such embodiments, the spoked coil support structure is still considered circumferentially-open as inner terminal ends of the spokes are exposed through inner diameter or inner circumference of the support structure. During manufacture, the pre-formed electromagnetic coils may be inserted onto the spokes from the interior of the coil support structure; and a cylindrical casing or tubular structure may then be inserted into the central opening provided through the coil support structure to circumferentially enclose the pre-formed coils after further filling or potting the interior of the stator housing assembly with an inorganic dielectric material in the below-described manner.

Spoked coil support structure 104 may be fabricated from a ferromagnetic or non-ferromagnetic material, such as aluminum, a non-ferromagnetic 300 series stainless steel, or a ceramic. In embodiments wherein spoked coil support structure 104 is fabricated from an electrically-conductive material, additional an electrically-insulative coating or shell may be formed over the outer surfaces of structure 104. For example, in embodiments wherein support structure 104 is fabricated from a stainless steel, spoked coil support structure 104 may be coated with an outer dielectric material utilizing, for example, a brushing, dipping, drawing, or spraying process; e.g., a glass may be brushed onto structure 104 as a paste or paint, dried, and then fired to form an electrically-insulative coating over selected areas of support structure 104. As a second example, in embodiments wherein the electromagnet coils disposed within an airtight or at least a liquid-tight package, an electrically-insulative inorganic cement of the type described below may be applied over the outer surfaces of spoked coil support structure 104 and cured to produce the electrically-insulative coating providing a breakdown voltage standoff between spoked coil support structure 104 and windings supported thereby. In some embodiments, a high temperature material containing a mixture of organic and ceramic materials may also be utilized for this purpose. As a further possibility, in embodiments wherein support structure 104 is fabricated from aluminum, spoked coil support structure 104 may be anodized to form an insulative alumina shell over the support structure's outer surface. In still further embodiments, spoked coil support structure 104 can be wrapped with a ceramic- or fiberglass-containing tape. In such cases, the tape may also contain organic materials, such as organic adhesives, which are burned away or otherwise decomposed during the below-described curing process.

Figure 7:
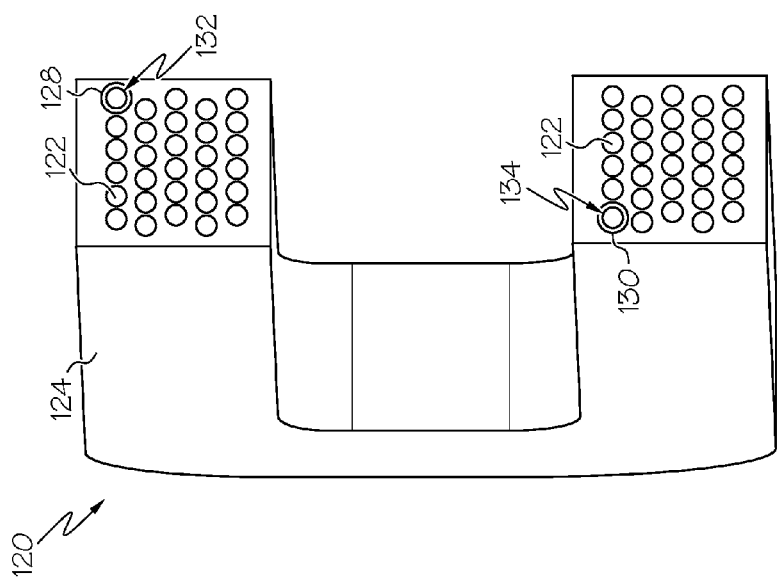
FIGS. 6 and 7 are isometric and cross-sectional views, respectively, of an encapsulated, pre-formed electromagnetic coil that may be included in the high temperature actuator produced pursuant to the exemplary fabrication method set-forth in FIG. 3.
Figure 6:
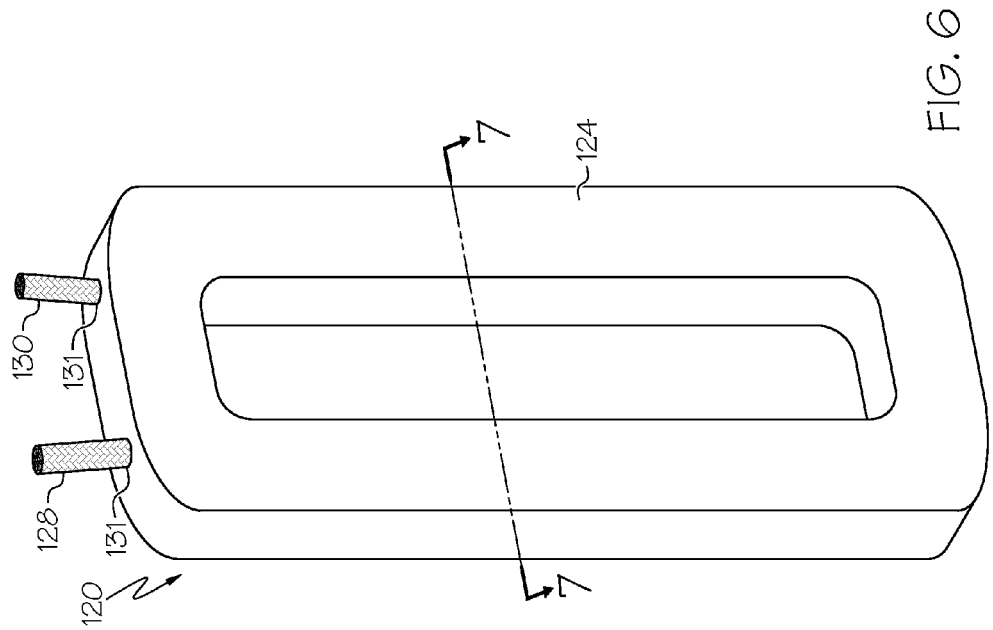

As indicated above, and continuing with STEP 103 of fabrication method 100 (FIG. 3), a number of pre-formed, electrically-insulated coils are positioned on or inserted over spokes 110 during manufacture of high temperature actuator 80 (FIG. 2). FIGS. 6 and 7 illustrate an exemplary encapsulated, pre-formed electromagnetic coil 120 suitable for positioning over one or more of radial spokes 110 of support structure 104 (FIGS. 4 and 5) during assembly of stator 82. As shown most clearly in FIG. 7, electromagnetic coil 120 includes a magnet wire 122, which has been wound to form a multi-layer, multi-turn electromagnetic coil. Magnet wire 122 is at least partially embedded within, surrounded by, or encapsulated by a body of dielectric material 124 (referred to herein as "electrically-insulative body 124"); and, in preferred embodiments, magnet wire 122 is wholly embedded within or encapsulated by a body of dielectric material 124 having a generally annular shape, the term "annular" encompassing bodies or structures of various different shapes having a central opening therethrough. In addition to providing electrical insulation between neighboring turns of coiled magnet wire 122 through the operative temperature range of the electromagnetic coil 120, electrically-insulative body 124 also serves as a bonding agent providing mechanical isolation and position holding of coiled magnet wire 122 and the lead wire portions extending into electrically-insulative body 124 (described below). By immobilizing the embedded coil and the embedded lead wire portions, electrically-insulative body 124 prevents wire chaffing and abrasion when electromagnetic coil assembly is utilized within a high vibratory environment. While the magnet wire 122 contained within encapsulated, pre-formed electromagnetic coil 120 is shown in FIG. 7 as wound in relatively neat or ordered manner, this is for clarity of illustration only; in actual production, the turns and layers of magnet wire 122 will typically be less neatly ordered, especially in instances wherein wire 122 is hand wound.

Coiled magnet wire 122 may be formed from a magnet wire having a relatively fine gauge; e.g., by way of non-limiting example, a gauge of about 30 to about 38 AWG, inclusive. However, embodiments of the present invention are also advantageously utilized when the coiled magnet wire is of a larger wire gauge (e.g., about 20 to 28 AWG) and could chip or otherwise damage the surrounding dielectric material during manipulation if allowed to pass from the interior to the exterior of electrically-insulative body 124. Thus, in preferred embodiments, the gauge of coiled magnet wire 122 may range from about 20 to about 38 AWG. Coiled magnet wire 122 may be fabricated from any suitable metal or metals including, but not limited to, copper, aluminum, nickel, and silver. Coiled magnet wire 122 may or may not be plated. When electromagnetic coil 120 is designed for usage within a high temperature environment, coiled magnet wire 122 is preferably fabricated from aluminum, silver, nickel, or clad-copper (e.g., nickel-clad copper). Advantageously, both aluminum and silver wire provide excellent conductivity enabling the dimensions and overall weight of high temperature actuator 80 to be reduced, which is especially desirable in the context of avionic applications. Relative to silver wire, aluminum wire is less costly and can be anodized to provide additional electrical insulation between neighboring turns of coiled magnet wire 122 and neighboring insulated windings and thereby reduce the likelihood of shorting and breakdown voltage during operation of high temperature actuator 80. By comparison, silver wire is more costly than aluminum wire, but is also more conductive, has a higher mechanical strength, has increased temperature capabilities, and is less prone to work hardening. The foregoing notwithstanding, coiled magnet wire 122 is preferably fabricated from aluminum wire and, more preferably, from anodized aluminum wire.

Pre-formed electromagnetic coil 120 (FIGS. 6 and 7) can be encapsulated utilizing a number of different processes; however, in preferred embodiments, either a wet winding or molding process is utilized. In both cases, a dielectric-containing material may applied in a wet or flowable state over the coiled magnet wire (e.g., as a paste, slurry, paint, etc.) and then subjected to a high temperature curing process to produce electrically-insulative body 124 in which magnet wire 122 is embedded. As appearing herein, the phrase "wet-state application," the term "wet-state," and similar terms and phrases are utilized to indicate that the dielectric-containing material is mixed, dissolved, or otherwise combined with sufficient liquid to enable application of the dielectric-containing material by painting, dipping, brushing, spraying, wet winding, or similar application technique. The term "wet-state application" also encompasses the application of organic dielectric materials, such as plastics, under temperature and/or pressures wherein the organic dielectric materials are melted, liquefied, or softened and can be dispensed, injected, or otherwise flowed over the coiled magnet wire.

Addressing first the wet winding process, magnet wire 122 may be wound into the desired shape (e.g., typically an annular coil having a generally rectangular profile with rounded corners, when viewed from the side) utilizing a conventional winding machine and to the dimensions corresponding to spoked coil support structure 104 (FIGS. 4 and 5). During wet winding, the magnet wire is wound while a dielectric-containing material is applied over the wire's outer surface in a wet or flowable state to form a viscous coating thereon. In an embodiment, the dielectric-containing material is composed of a ceramic or other inorganic material that is mixed with, dissolved within, or otherwise combined with a sufficient quantity of liquid to be applied over the magnet wire in real-time during the wet winding process by brushing, spraying, or a similar application technique. In the wet-state, the dielectric-containing material may assume the form of a pre-cure (e.g., water-activated) cement or a plurality of ceramic (e.g., low melt glass) particles dissolved in a solvent, such as a high molecular weight alcohol, to form a slurry or paste. The selected dielectric-containing material may be continually applied in a wet-state over the full width of the magnet wire to the entry point of the coil such that the puddle of liquid is formed through which the existing wire coils continually pass. The magnet wire may be slowly turned during application of the dielectric material by, for example, a rotating apparatus or wire winding machine, and a relatively thick layer of the dielectric-containing material may be continually brushed onto the wire's surface to ensure that a sufficient quantity of the material is present to fill the space between neighboring turns and multiple layers of coiled magnet wire 122. In large scale production, application of the selected dielectric-containing material to the magnet wire may be performed utilizing a pad, brush, or automated dispenser, which dispenses a controlled amount of the dielectric material over the wire during winding.

During the above-described wet winding process, magnet wire 122 may be wound around an arbor or mandrel generally having the desired shape of the final electromagnetic coil. Magnet wire 122 and the electrically-insulative body 124 encapsulating magnet wire 122 may be removed from the arbor or mandrel while body 124 is still in a wet or partially wet state. Encapsulated electromagnetic coil 120 may then be positioned on coil support structure 104 and cured utilizing a thermal curing process of the type described below. In certain cases, electrically-insulative body 124 may be partially cured, by thermal treatment or air drying, prior to removal from the arbor or mandrel to increase the rigidity of body 124 and thereby facilitate removal from the arbor or mandrel. To further facilitate removal of encapsulated electromagnetic coil 120, the arbor or mandrel may be collapsible or able to be disassembled. Alternatively, the arbor or mandrel may be formed from a sacrificial material, such as a plastic or wax, that can be chemically dissolved, burned away, or at least softened to facilitate removal of the coiled magnet wire with minimal manipulation of the electromagnetic coil.

Encapsulated electromagnetic coil 120 can also be fabricated utilizing a molding process during STEP 103 of fabrication method 100 (FIG. 3). As was the case previously, magnet wire 122 may again be wound into the desired shape utilizing a conventional winding machine. However, in this case, the dielectric material is not applied to magnet wire 122 during winding and the winding process yields a non-encapsulated electromagnetic coil. In embodiments wherein magnet wire 122 comprises anodized aluminum wire, the alumina shell of the wire may provide electrical insulation between neighboring turns of the coil. After winding, the non-encapsulated wire coil may be removed from the arbor or mandrel as previously described and positioned within a mold having the desired shape of the final electromagnetic coil 120. The mold may then be filled with the selected inorganic dielectric material, which is introduced in a wet or flowable state and drawn through the mold utilizing, for example, vacuum infiltration. As a more specific example, after positioning of coiled magnet wire 122 therein, the mold may be filled with an inorganic dielectric cement and placed under vacuum to infiltrate all windings of the coiled magnet wire. To facilitate removal of the molded dielectric body from the mold, the interior of the mold may be coated with or formed from a non-stick material, such as polytetrafluoroethylene. Thermal curing may then be performed, as described below, to harden encapsulated electromagnetic coil 120 thereby allowing the rigid or substantially rigid coil to be easily removed from the mold and placed on coil support structure 104 (FIGS. 4 and 5). Additional heat treatment may also be performed after positioning of electromagnetic coil 120 and a number of like coils around spokes 110 of coil support structure 104, as described below in conjunction with FIG. 10.

In embodiments wherein coiled magnet wire 122 is produced utilizing anodized aluminum wire, electrically-insulative body 124 is preferably formed from a material having a coefficient of thermal expansion ("CTE") approaching that of aluminum (approximately 23 parts per million per degree Celsius), but preferably not exceeding the CTE of aluminum, to minimize the mechanical stress applied to the anodized aluminum wire during thermal cycling. Thus, in embodiments wherein coiled magnet wire 122 is produced from anodized aluminum wire, electrically-insulative body 124 is preferably formed to have a CTE exceeding approximately 10 parts per million per degree Celsius ("ppm per ° C.") and, more preferably, a CTE between approximately 16 and approximately 23 ppm per ° C. Suitable materials include inorganic cements and certain low melt glasses (i.e., glasses or glass mixtures having a melting point less than the melting point of anodized aluminum wire), such as leaded borosilicate glasses. As a still more specific example, electrically-insulative body 124 may be produced from a water-activated, silicate-based cement, such as the sealing cement bearing Product No. 33S and commercially available from the SAUEREISEN® Cements Company, Inc., headquartered in Pittsburgh, Pa. Additional description of materials and methods useful in the formation of electrically-insulative body 124 is provided in co-pending U.S. application Ser. No. 13/038,838, entitled "HIGH TEMPERATURE ELECTROMAGNETIC COIL ASSEMBLIES AND METHODS FOR THE PRODUCTION THEREOF," and filed Mar. 2, 2011, which bears a common assignee with the Instant Application and which is hereby incorporated by reference.

In further embodiments, electrically-insulative body 124 can be fabricated from dielectric-containing material comprising a mixture of at least a low melt glass and a particulate filler material. Low melt glasses having coefficients of thermal expansion exceeding approximately 10 ppm per ° C. include, but are not limited to, leaded borosilicates glasses. Commercially available leaded borosilicate glasses include 5635, 5642, and 5650 series glasses having processing temperatures ranging from approximately 350° C. to approximately 550° C. and available from KOARTAN™ Microelectronic Interconnect Materials, Inc., headquartered in Randolph, N.J. The material containing the low melt glass is conveniently applied as a paste or slurry, which may be formulated from ground particles of the low melt glass, the particulate filler material, a solvent, and a binder. In a preferred embodiment, the solvent is a high molecular weight alcohol resistant to evaporation at room temperature, such as alpha-terpineol or TEXINOL®; and the binder is ethyl cellulose, an acrylic, or similar material.

It is desirable to include a particulate filler material in the embodiments wherein the electrically-insulative, inorganic material comprises a low melt glass to prevent relevant movement and physical contact between neighboring coils of the anodized aluminum wire during coiling and firing processes. Although the filler material may comprise any particulate material suitable for this purpose (e.g., zirconium or aluminum powder), binder materials having particles generally characterized by thin, sheet-like shapes (commonly referred to as "platelets" or "laminae") have been found to better maintain relative positioning between neighboring coils as such particles are less likely to dislodge from between two adjacent turns or layers of the wire's cured outer surface than are spherical particles. Examples of suitable binder materials having thin, sheet-like particles include mica and vermiculite. The dielectric-containing material, and thus the low melt glass, is conveniently applied to the magnet wire in a wet state by brushing immediately prior to the location at which the wire is coiled around the support structure utilizing a wet winding process of the type described above.

One or both of the opposing terminal ends of magnet wire 122 may project from electrically-insulative body 124 to provided electrical connection to the windings embedded therein. However, in instances wherein body 124 is formed from an inorganic material or medium that is highly rigid when cured, magnet wire 122 may be effectively fixed or anchored in place at the wire's entry point into or exit point from dielectric body 124. As the external segment of magnet wire 122 is subjected to unavoidable bending, pulling, and twisting forces during assembly, significant mechanical stress concentrations may occur at the wire's entry or exit point from the dielectric body. The fine gauge magnet wire may consequently mechanically fatigue and work harden at this interface during the assembly process. Work hardening may be especially problematic in instances wherein magnet wire 122 is fabricated from aluminum or another metal prone to these issues. For at least this reason, it is preferred that lead wires are joined to the terminal end portions of magnet wire 122 within electrically-insulative body 124 and projects therefrom to provide electrical connection to the embedded coil. The lead wires can be single-strand wires having any suitable gauge and fabricated from a non-aluminum metal resistant to work hardening, or the lead wires can be single-strand aluminum wires having a larger gauge than does magnet wire 122. These examples notwithstanding, the lead wires joined to opposing ends of magnet wire 122 have a braided or woven structure to provide increased flexibility, resistance to fatigue and work hardening, and added redundancy.

In the illustrated example, and as shown most clearly in FIG. 6, first and second braided lead wires 128 and 130, which are joined to opposing end portions of coiled magnet wire 122. Braided lead wires 128 and 130 extend into or emerge from electrically-insulative body 124 at entry/exit points 131. Braided lead wires 128 and 130 thus each include a terminal end portion or segment, which extends into and is contained within electrically-insulative body 124 and which is joined to an opposing end portion of coiled magnet wire 122. Braided lead wires 128 and 130 may each assume the form of a plurality of filaments (e.g., 24 fine gauge filaments) interwoven into a flat ribbon, an elongated tube (shown in FIGS. 6 and 7), or a similar woven structure. Braided lead wires 128 and 130 can be fabricated from a wide variety of metals and alloys, including copper, aluminum, nickel, stainless steel, and silver. Depending upon the particular metal or alloy from which braided lead wires 128 and 130 are formed, the lead wires may also be plated or clad with various metals or alloys to increase electrical conductivity, to enhance crimping properties, to improve oxidation resistance, and/or to facilitate soldering or brazing. Suitable plating materials include, but are not limited to, nickel, aluminum, gold, palladium, platinum, and silver.

As shown most clearly in FIG. 7, braided lead wire 128 is mechanically and electrically joined to a first end portion of coiled magnet wire 122 by way of a first joint 132. Similarly, a second braided lead wire 130 is mechanically and electrically joined to an opposing end portion of coiled magnet wire 122 by way of a second joint 134 (also shown in FIG. 7). As will be described more fully below, joints 132 and 134 may be formed by any suitable combination of soldering, crimping, twisting, or the like. In preferred embodiments, joints 132 and 134 are embedded or buried within electrically-insulative body 124. Joints 132 and 134, and therefore the opposing end portions of coiled magnet wire 122, are thus mechanically isolated from bending and pulling forces exerted on the external portions of braided lead wires 128 and 130. Consequently, in embodiments wherein coiled magnet wire 122 is produced utilizing a fine gauge wire and/or a metal (e.g., anodized aluminum) prone to mechanical fatigue and work hardening, the application of strain and stress to coiled magnet wire 122 is consequently minimized and the development of high resistance hot spots within wire 122 is avoided. By comparison, due to their interwoven structure, braided lead wires 128 and 130 are highly flexible and can be repeatedly subjected to significant bending, pulling, twisting, and other manipulation forces without appreciable mechanical fatigue or work hardening. Additionally, as braided lead wires 128 and 130 each contain a plurality of filaments, lead wires 128 and 130 provide redundancy and thus improve the overall reliability of electromagnetic coil 120.

To facilitate connection to a given braided lead wire, the coiled magnet wire is preferably inserted or threaded into the braided lead wire prior to formation of the wire-to-lead joint. In embodiments wherein the braided lead wire is a flat woven ribbon (commonly referred to as a "flat braid"), the fine gauge magnet wire may be inserted through the sidewall of the interwoven filaments and, perhaps, woven into the braided lead wire by repeatedly threading the magnet wire through the lead wire's filaments in an undulating pattern. Alternatively, in embodiments wherein the braided lead is an interwoven tube (commonly referred to as a "hollow braid"), an end portion of the coiled magnet wire may be inserted into the central opening of the tube or woven into the braided lead wire in the previously-described manner. For example, as shown in FIG. 8, an end portion 136 of coiled magnet wire 122 may be inserted into an end portion 138 of braided lead wire 128. Joint 132 may then be formed by soldering and/or crimping. For example, and as indicated in FIG. 8 by arrows 140, end portion 138 of hollow braided lead wire 128 may be crimped over end portion 136 of coiled magnet wire 122.

In forming crimp joint 132 shown in FIG. 8, a deforming force is applied to opposing sides of end portion 138 of braided lead wire 130 into which end portion 136 of coiled magnet wire 122 has previously been inserted. In this manner, end portion 138 of braided hollow lead wire 130 serves as a crimp barrel, which is deformed over and around end portion 136 of coiled magnet wire 122. The crimping process is controlled to induce sufficient deformation through crimp joint 134 to ensure the creation of a metallurgical bond or cold weld between coiled magnet wire 122 and braided lead wire 130 forming a mechanical and electrical joint. Crimping can be performed with a hydraulic press, pneumatic crimpers, or certain hand tools (e.g., hand crimpers and/or a hammer). In embodiments wherein braided lead wires are crimped to opposing ends of the magnet wire, it is preferred that the braided lead wires and the coiled magnet wire are fabricated from materials having similar or identical hardnesses to ensure that the deformation induced by crimping is not overly concentrated in a particular, softer wire; e.g., in preferred embodiments wherein joints 132 and 134 are formed by crimping, coiled magnet wire 122, braided lead wire 128, and braided lead wire 130 may each be fabricated from aluminum.

It will be appreciated that braided lead wire 128 may be joined to the opposing end of coiled magnet wire 122 utilizing a similar crimping process to form crimp joint 134 (FIG. 7). Furthermore, while only a single crimp joint is shown in FIG. 8 for simplicity, it will be appreciated that multiple crimps can be utilized to provide redundancy and ensure optimal mechanical and/or electrical bonding of the braided lead wires and the coiled magnet wire. It may be desirable to impart one or more of the crimp joints included within electromagnetic coil 120 with a tapered geometry to ensure the simultaneous formation of optimal metallurgical and electrical bonds, as described more fully in co-pending U.S. application Ser. No. 13/187,359, entitled "ELECTROMAGNETIC COIL ASSEMBLIES HAVING TAPERED CRIMP JOINTS AND METHODS FOR THE FABRICATION THEREOF," and filed Jul. 20, 2011, which bears a common assignee with the Instant Application and which is hereby incorporated by reference.

In addition to or in lieu of crimping, end portion 138 of braided lead wire 130 may be joined to end portion 136 of coiled magnet wire 122 by soldering. In this case, solder material, preferably along with flux, may be applied to joint 132 and heated to cause the solder material to flow into solder joint 132 to mechanically and electrically join magnet wire 122 and lead wire 130. A braze stop-off material is advantageously impregnated into or otherwise applied to braided lead wire 130 adjacent the location at which braided lead wire 130 is soldered to coiled magnet wire 122 (represented in FIG. 8 by dashed circle 142) to prevent excessive wicking of the solder material away from joint 132. Soldering may be performed by exposing the solder materials to an open flame utilizing, for example, a microtorch. Alternatively, soldering or brazing may be performed in a controlled atmosphere oven. The oven is preferably purged with an inert gas, such as argon, to reduce the formation of oxides on the wire surfaces during heating, which could otherwise degrade the electrical bond formed between coiled magnet wire 122 and braided lead wires 128 and 130. If containing potentially-corrosive constituents, such as fluorines or chlorides, the flux may be chemically removed after soldering utilizing a suitable solvent.

If desired, an electrically-insulative (e.g., fiberglass or ceramic) cloth can be wrapped around the exterior of pre-formed electromagnetic coil 120 to further electrically insulate coil 120 from stator housing assembly 90 (if fabricated from a metal or other electrically-conductive material) and from neighboring coils included within high temperature actuator 80. Further emphasizing this point, FIG. 9 illustrates pre-formed electromagnetic coil 120 after an electrically-insulative covering 144 has been wrapped around the exterior of coil 120. In one embodiment, electrically-insulative covering is a fiberglass or ceramic cloth that is wrapped coil 120 and then sewn in place. Similarly, as further shown in FIG. 9, electrically-insulative braided or woven sleeves 146 and 148 (e.g., woven fiberglass tubes) may be positioned the terminal end portions of braided lead wires 128 and 130, respectively, and may extend into electrically-insulative body 124. During manufacture of actuator 80, sleeves 146 and 148 may be slid into place after formation of joints 132 and 134, respectively. Additional dielectric-containing material may then be applied over each joint and the portion of the sleeve wrapping around the previously-deposited portion dielectric body 124. As a result, the inner terminal ends of sleeve 146 and 148 will be buried or embedded within the outer regions of electrically-insulative body 124, when completed and transformed into a hardened or solid state pursuant to curing.

Figure 10:
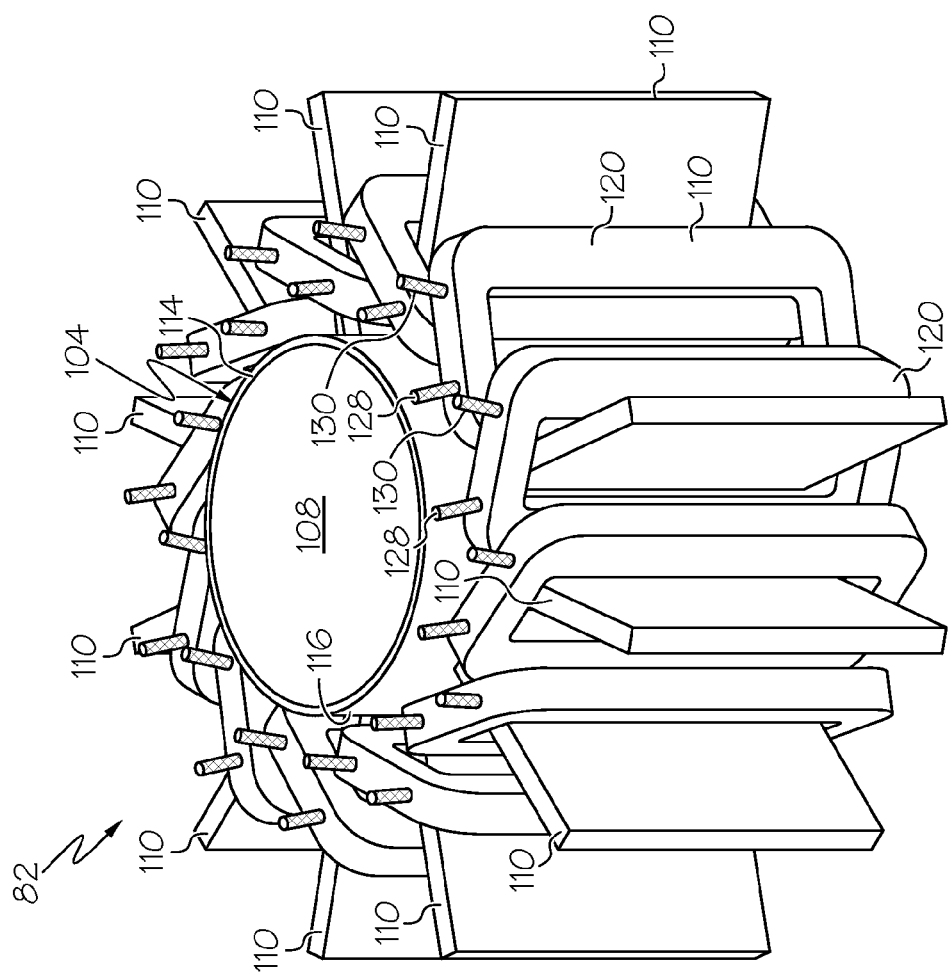
Figure 11:
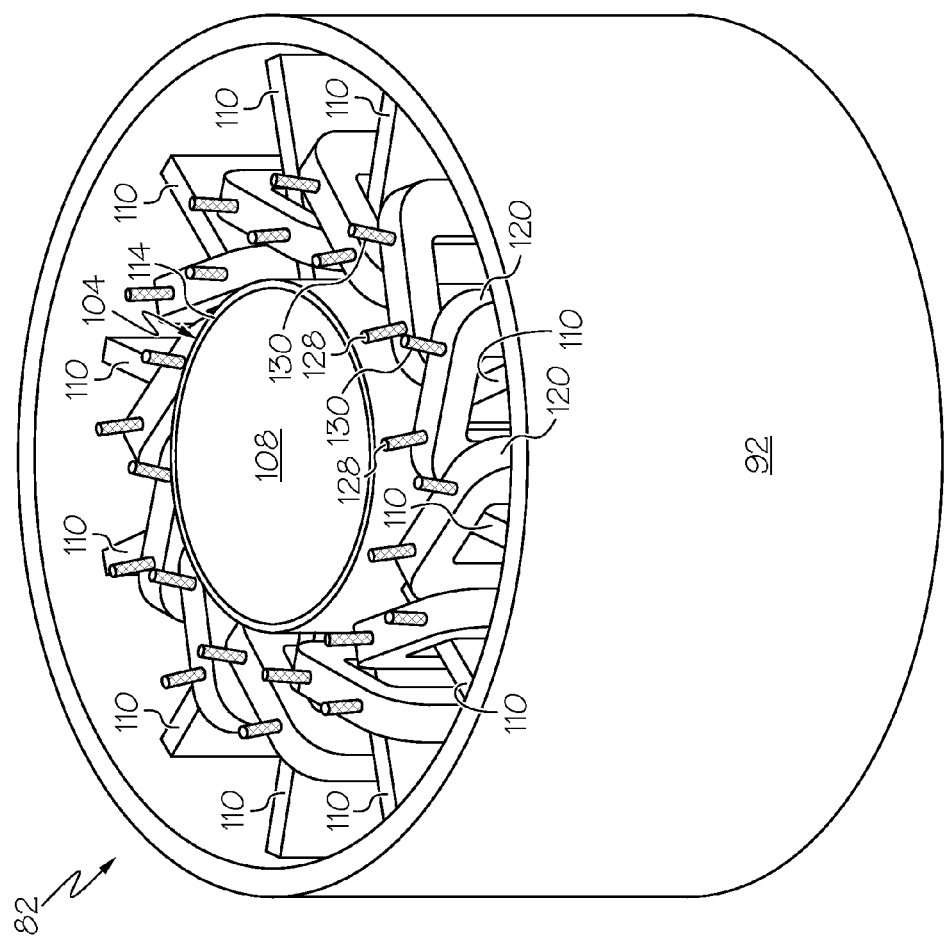

After the fabrication of pre-formed electromagnetic coil 120 and a number of similar pre-formed electromagnetic coils, the electromagnetic coils are loaded onto spokes 110 of spoked coil support structure 104 (FIGS. 4 and 5) in an annual array or grouping (STEP 103, FIG. 3). FIG. 10 illustrates partially-fabricated stator 82 after positioning of a number of pre-formed electromagnetic coils 120 around spokes 110 of coil support structure 104 (electrically-insulative covering 144 and sleeves 146 and 148 of each coil 120 are not shown in FIG. 10 for clarity). In the illustrated example, pre-formed electromagnetic coils 120 are arranged such that approximately one half of each coil overlaps with approximately one half of an adjacent coil in each stator slot, as taken in a radial direction. Pre-formed electromagnetic coils 120 may also be arranged in various other spatial arrays wherein the pre-formed electromagnetic coils 120 may or may not overlap radially within stator slots 112 (labeled in FIGS. 4 and 5). For example, in further embodiments wherein each coil 120 is inserted over a different radial spoke 110 such magnet wire occupies each stator slots 112 (that is, no stator slots are "skipped" during positioning of the electromagnet coils), the adjacent legs of neighboring coils may be placed in a non-overlapping or side-by-side relationship within each slot 112. In still further embodiments, pre-formed electromagnetic coils 120 may be arranged such that not all slots are occupied by coils 120 or such that portions of three or more pre-formed coils occupy a single slot. It is generally preferred, however, that each stator slot 112 is largely occupied by wound wire to optimize the electromagnetic efficiency of high temperature actuator 80 (FIG. 2); e.g., it may be desirable to achieve a packing efficiency of about 25-40% of the slot volume occupied by magnet wire, in at least some embodiments.

At some juncture after application of the dielectric-containing material over the coiled magnet wire, the green state dielectric-containing material is cured to produce electrically-insulative body 124. Curing can be performed prior to or after insertion of pre-formed electromagnetic coils 120 onto stator 82. As appearing herein, the term "curing" denotes exposing the wet-state, dielectric-containing material to process conditions (e.g., temperatures) sufficient to transform the material into a solid dielectric medium or body, whether by chemical reaction, by melting of particles, or otherwise. The term "curing" is thus defined to include firing of, for example, low melt glasses. In many cases, curing of the chosen dielectric-containing material will involve thermal cycling over a relatively wide temperature range, which will typically entail exposure to elevated temperatures well exceeding room temperatures (e.g., about 20-25° C.), but less than the melting point of the magnet wire (e.g., in the case of anodized aluminum wire, approximately 660° C.). However, in embodiments wherein the chosen dielectric-containing material is an inorganic cement curable at or near room temperature, curing may be performed, at least in part, at correspondingly low temperatures. For example, if the chosen dielectric-containing material is an inorganic cement, partial curing may be performed at a first temperature slightly above room temperature (e.g., at approximately 82° C.) to drive out excess moisture before further curing is performed at higher temperatures exceeding the boiling point of water. In preferred embodiments, curing is performed at temperatures up to the expected operating temperatures of electromagnetic coil 120, which may approach or exceed approximately 315° C. In embodiments wherein coiled magnet wire 122 is produced utilizing anodized aluminum wire, it is also preferred that the curing temperature exceeds the annealing temperature of aluminum (e.g., approximately 340° C. to 415° C., depending upon wire composition) to relieve any mechanical stress within the aluminum wire created during processing. High temperature curing may also form aluminum oxide over any exposed areas of the anodized aluminum wire created by abrasion during winding to further reduces the likelihood of shorting.

Next, at STEP 149 of exemplary method 100 (FIG. 3), a cylindrical casing 92 may be disposed around spoked coil support structure 104 to circumferentially enclosure support structure 104 and the electromagnetic coils 120 supported thereby. In a preferred embodiment, cylindrical casing 92 is affixed around coil support structure 104 utilizing a thermal shrink fit process. In such a shrink fit process, cylindrical casing 92 may be heated to a predetermined elevated temperature utilizing a specialized fixture to expand casing 92 and increase the inner diameter thereof. The heated casing 92 may then be positioned over the relative cool coil support structure 104 and the electromagnetic coils supported thereby. After being properly positioned, cylindrical casing 92 may then be allowed to cool and contract. As casing 92 contracts, the inner circumferential surface of casing 92 comes into contact and exerts an inward clamping force on the outer terminal ends of spokes 110 thereby locking casing 92 in its desired position around coil support structure 104 to circumferentially enclose coils 120. In further implementations of method 100, other techniques or physical means may be utilized to secure cylindrical casing 92 around spoked coil support structure 104 in the above-described manner including, for example, a press fit or interference fit technique.

Figure 12:
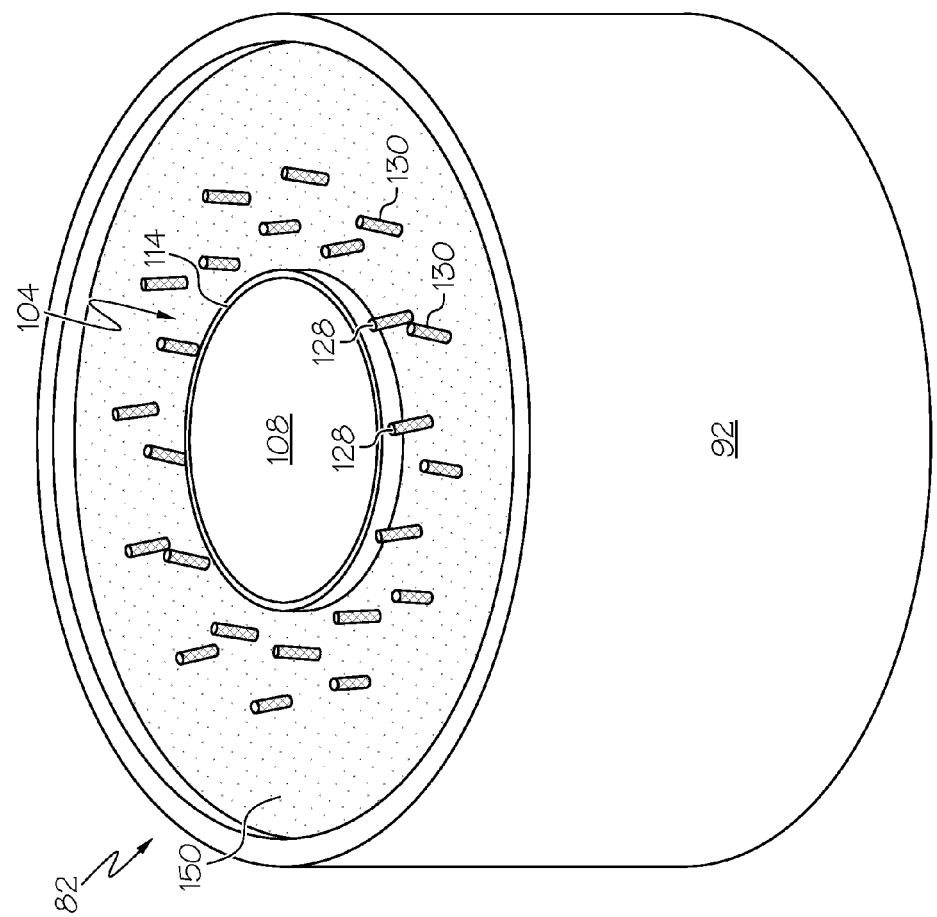

After fitting casing 92 over coil support structure 104 in the above-described manner, the free space within the partially-fabricated stator housing assembly 90 may be filled with a dielectric potting material 150 (STEP 151, FIG. 3). The resulting structure is shown in FIG. 12. In one embodiment, a non-stick (e.g., polytetrafluoroethylene) plate is positioned over one end of partially-fabricated stator 82 and the stators slots are filled with the potting material to eliminate any voids therein. Suitable potting materials include the dielectric materials of the type described above, as well as other types of inorganic and organic dielectric materials, such as high temperature silicones. As can be seen in FIG. 12, the potted dielectric body 150 may occupy the substantial entirety of housing assembly 90 such that preformed electromagnetic coils 120 are encased within body 150, while braided lead wires 128 and 130 project upwardly therefrom. Selected braided lead wires 128 and 130 of each coil 120 can be wired together or interconnected at this juncture in the manufacturing process with certain lead wires 128 and 130 left unconnected for subsequent joinder to the conductors of a feedthrough connector, such as pins 98 of feedthrough connector 96 described below in conjunction with FIG. 13.

With reference to FIG. 13, an end plate or cover piece 94 is next joined to coil support structure 104 and casing 92 to at least partially enclose the interior of stator 82 housing electromagnetic coils 120 (STEP 153, FIG. 3). Cover piece 94 is generally conformal with the geometry and dimensions of space between coil support structure 104 and cylindrical casing 92 such that cover piece 94 encloses the open end of stator housing assembly 90. The inner and outer circumferential edges of cover piece 94 may be welded to the inner protruding circumferential edge of coil support structure 104 and the circumferential edge of the open end of casing 92, respectively, to produce the desired seals. After attachment of cover piece 94, additional dielectric material may be injected or otherwise introduced into the interior of stator 82 through a fill port 162 provided through cover piece 94 (FIG. 13) to fill any remaining free space therein. A plug piece 99 may then be utilized to seal fill port 162, as shown in FIG. 2, and thereby completely hermetically enclose the interior of stator 82. At least one external feedthrough connector 96 (e.g., a metal-to-glass feedthrough) extends through a wall of stator housing assembly 90 to enable electrical connection to the electromagnetic coils contained within housing assembly 90 while bridging the hermetically-sealed environment within stator 82. For example, as shown in FIG. 13, a feedthrough connector 96 may extend into a tubular chimney structure mounted through cover piece 94. Other types of feedthrough connectors, such as mineral-insulated cables, can also be utilized in further embodiments. While feedthrough connector 96 is shown as having three pins 98 in the illustrated example shown in FIG. 13, the number of pins (or other feedthrough conductors) will inevitably vary between embodiments depending upon the number of electromagnetic coils contained within stator 82 and the manner in which the coils are interconnected. From this juncture in the manufacturing process, conventional steps may be carried-out to complete fabrication of high temperature motor actuator 80 (STEP 155, FIG. 3) including the installation of rotor 84 shown in FIG. 2.

The foregoing has thus provided embodiments of an electric motor-based actuator suitable for operation in high temperature applications characterized by maximum temperatures exceeding, for example, about 260° C. The foregoing has also provided embodiments of such a gas turbine engine actuation system including such a high temperature motor actuator. Methods for the fabrication of such a high temperature motor actuator have also been provided. During fabrication of the stator included within the high temperature motor actuator, a number of electromagnetic coils were preformed and then inserted onto the open spokes of a coil support structure. In the above-described exemplary embodiments, the preformed coils were encapsulated in an inorganic dielectric material prior to insertion onto the spokes of the coil support structure. However, in further embodiments, the preformed coils may inserted onto the coil support structure prior to encapsulation and the partially-completed stator may then be infiltrated with the selected inorganic dielectric material to provide additional isolation between the coils, as described more fully below in conjunction with FIG. 14.

FIG. 14 is a top down view of a stator 158 after a number of non-encapsulated electromagnetic coils 160 have been distributed about the centerline of stator 158 and, specifically, radially inserted over spokes 110 of coil support structure 104 in an overlapping or staggered relationship. Electrical isolation between neighboring coils 160, between the turns of each coil 160, and between coils 160 and coil support structure 104 (if fabricated from an electrically-conductive material) may be provided by utilizing anodized aluminum wire to form coils 160, in an embodiment. Additionally, the non-encapsulated electromagnetic coils 160 may be wrapped in an electrically-insulative covering (not shown in FIG. 14 to reveal coils 160), such as a fiberglass or ceramic cloth similar to that described above in conjunction with FIG. 9. Each coil 160 may be wound around a mandrel or arbor as previously described and, in certain implementations, may then be press-fit onto a shaping fixture to force the coil to the precise shape and dimensions of stator slots 112. After distribution around coil support structure 104, the assembly may then be infiltrated with a wet-state inorganic cement, a wet-state borosilicate-glass containing material, or another wet-state inorganic dielectric material utilizing, for example, a vacuum infiltration or impregnation process. The entire assembly may then be cured and additional assembly can then be performed utilizing the above-described process (e.g., disposing a cylindrical casing around coil support structure 104, attaching/plugging a cover piece to hermetically seal the interior of stator 158, installing a rotor, etc.) to complete production of the high temperature motor actuator.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A gas turbine engine actuation system, comprising:
an actuated gas turbine engine component; and
a high temperature actuator, comprising:
  a rotor mechanically linked to the actuated gas turbine engine component; and
  a stator surrounding at least a portion of the rotor, the stator comprising:
    a coil support structure having a plurality of spokes extending radially therefrom;
    a plurality of pre-formed electromagnetic coils circumferentially distributed about the coil support structure, each of the plurality of pre-formed electromagnetic coils inserted over at least one of the plurality of spokes in a radial direction;
    an inorganic dielectric material in which each of the plurality of pre-formed electromagnetic coils is at least partially embedded;
    a casing disposed around the coil support structure and circumferentially enclosing the plurality of pre-formed wire coils
    a cover piece joined between the coil support structure and the casing to produce a hermetically-sealed stator package;
  wherein the casing has an open end portion and a closed end portion, wherein the coil support structure has a protruding circumferential edge extending beyond the plurality of spokes in a longitudinal direction, and wherein the cover piece is sealingly joined between the open end portion and the protruding circumferential edge of the coil support structure.

2. The gas turbine engine actuation system of claim 1 wherein the casing is thermally fit around the plurality of spokes and exerts an inward clamping force on the outer terminal ends of the plurality of spokes.

3. The gas turbine engine actuation system of claim 1 wherein the coil support structure comprises:
a tubular body from which the plurality of spokes extends; and
a plurality of stator slots defined, at least in part, by a circumferential surface of the tubular body and the plurality of spokes.

4. The gas turbine engine actuation system of claim 3 wherein the plurality of pre-formed electromagnetic coils are circumferentially distributed about the coil support structure such that each of the plurality of stator slots accommodates a portion of at least two different electromagnetic coils in a radially overlapping or side-by-side relationship.

5. The gas turbine engine actuation system of claim 1 wherein actuated gas turbine engine component comprises at least one of the group consisting of a variable inlet guide vane, a bleed valve, and a variable area exhaust nozzle.

6. The gas turbine engine actuation system of claim 1 wherein the plurality of pre-formed coils comprise wound anodized aluminum wire.

7. The gas turbine engine actuation system of claim 1 wherein the inorganic dielectric material comprises an inorganic cement.

8. The gas turbine engine actuation system of claim 1 wherein the stator comprises:
a hermetically-sealed housing assembly in which the coil support structure is included; and
a feedthrough assembly extending through the hermetically-sealed housing assembly and having a plurality of conductors electrically coupled to the plurality of pre-formed wire coils.

9. The gas turbine engine actuation system of claim 8 wherein the hermetically-sealed housing assembly is filled, at least in substantial part, with at least one inorganic dielectric material.

10. The gas turbine engine actuation system of claim 1 wherein the plurality of pre-formed electromagnetic coils are inserted over at least one of the plurality of spokes as a plurality of pre-formed electromagnetic coils encapsulated by the inorganic dielectric material.

11. The gas turbine engine actuation system of claim 1 wherein each of the plurality of pre-formed electromagnetic coils comprises wound anodized aluminum wire.

12. The gas turbine engine actuation system of claim 11 wherein at least one of the plurality of pre-formed electromagnetic coils further comprises braided lead wires extending into the inorganic dielectric material encapsulating the pre-formed electromagnetic coil and joined to opposing end portions of the wound anodized aluminum wire.

13. The gas turbine engine actuation system of claim 1 further comprising an electrically-insulative cloth wrapped around each of the plurality of pre-formed coils.

14. The gas turbine engine actuation system of claim 1 wherein the inorganic dielectric material comprises at least one of the group consisting of an inorganic cement and a borosilicate glass.

* * * * *